US010536954B2

(12) United States Patent
Andou et al.

(10) Patent No.: US 10,536,954 B2
(45) Date of Patent: Jan. 14, 2020

(54) USER APPARATUS, BASE STATION, AND GAP CONFIGURATION METHOD

(71) Applicant: NTT DOCOMO, INC., Tokyo (JP)

(72) Inventors: Kei Andou, Tokyo (JP); Kunihiko Teshima, Tokyo (JP); Tooru Uchino, Tokyo (JP); Kazuki Takeda, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 15/574,872

(22) PCT Filed: Jun. 30, 2016

(86) PCT No.: PCT/JP2016/069514
§ 371 (c)(1),
(2) Date: Nov. 17, 2017

(87) PCT Pub. No.: WO2017/033568
PCT Pub. Date: Mar. 2, 2017

(65) Prior Publication Data
US 2018/0132258 A1 May 10, 2018

(30) Foreign Application Priority Data
Aug. 21, 2015 (JP) ................. 2015-164258

(51) Int. Cl.
H04W 72/12 (2009.01)
H04W 24/10 (2009.01)
H04W 16/14 (2009.01)

(52) U.S. Cl.
CPC ......... *H04W 72/121* (2013.01); *H04W 24/10* (2013.01); *H04W 72/1215* (2013.01); *H04W 72/1257* (2013.01); *H04W 16/14* (2013.01)

(58) Field of Classification Search
CPC combination set(s) only.
See application file for complete search history.

(56) References Cited

U.S. PATENT DOCUMENTS

| 2011/0274007 | A1* | 11/2011 | Lin | H04W 36/0094 370/254 |
| 2013/0107743 | A1* | 5/2013 | Ishii | H04L 5/001 370/252 |
| 2014/0146732 | A1* | 5/2014 | Olufunmilola | H04W 24/10 370/311 |
| 2014/0200011 | A1 | 7/2014 | Moilanen et al. | |
| 2014/0341192 | A1* | 11/2014 | Venkob | H04W 24/00 370/336 |

FOREIGN PATENT DOCUMENTS

| EP | 2953392 A1 | 12/2015 |
| EP | 3261394 A1 | 12/2017 |

(Continued)

OTHER PUBLICATIONS

International Search Report issued in corresponding application No. PCT/JP2016/069514 dated Aug. 9, 2016 (4 pages).

(Continued)

*Primary Examiner* — Chi H Pham
*Assistant Examiner* — Fahmida S Chowdhury
(74) *Attorney, Agent, or Firm* — Osha Liang LLP

(57) ABSTRACT

A user apparatus is provided. The user apparatus performs communications with a base station in a mobile communication system in which at least two carriers with different TTIs are used. The user apparatus includes a gap control unit configured to set a gap that is a period in which the user apparatus does not perform communications with the base station. The gap control unit sets a gap common to a gap set for one of the two carriers as a gap for the other of the two carriers.

13 Claims, 22 Drawing Sheets

(56) References Cited

FOREIGN PATENT DOCUMENTS

| WO | 2015105813 A2 | 7/2015 |
| WO | 2015115772 A1 | 8/2015 |
| WO | 2016187066 A1 | 11/2016 |

OTHER PUBLICATIONS

Written Opinion of the International Searching Authority issued in corresponding application No. PCT/JP2016/069514 dated Aug. 9, 2016 (5 pages).
3GPP TS 36.133 V12.8.0, "3rd Generation Partnership Project; Technical Specification Group Radio Access Network; Evolved Universal Terrestrial Radio Access (E-UTRA); Requirements for support of radio resource management (Release 12)"; Jul. 2015 (1412 pages).
3GPP TS 36.331 V12.6.0, "3rd Generation Partnership Project; Technical Specification Group Radio Access Network; Evolved Universal Terrestrial Radio Access (E-UTRA); Radio Resource Control (RRC); Protocol specification (Release 12)"; Jun. 2015 (449 pages).
Ericcson, "Introduction of measurement gap requirements for DC in 36.133"; 3GPP TSG-RAN Working Group 4 (Radio) Meeting #73, R4-147587; San Francisco, USA; Nov. 17-21, 2014 (4 pages).
Extended European Search Report issued in the counterpart European Patent Application No. 16838915.3, dated Feb. 28, 2019 (13 pages).

* cited by examiner

USER APPARATUS, BASE STATION, AND GAP CONFIGURATION METHOD

BACKGROUND OF THE INVENTION

1. Field of the Invention

The present invention relates to a configuration (setting) of a gap (GAP) used for measurements or the like in a mobile communication system.

2. Description of the Related Art

In a mobile communication system such as an LTE system, in order to allow a user apparatus UE to connect to a better quality cell, or in order to achieve an object such as load balancing, a measurement indication is transmitted to the user apparatus UE and the user apparatus is caused to measure radio quality (e.g., NPL 1).

When measuring radio quality of a frequency different from a frequency used for current communications, it is necessary for a user apparatus UE to perform RF tuning to tune its reception frequency to the frequency to be measured, and at that time, it is necessary for the user apparatus UE to stop current communications temporarily. A period during which the current communications are stopped is referred to as a measurement gap (hereinafter, referred to as a gap). During the gap period, the user apparatus UE does not perform DL signal reception or UL signal transmission. The gap is set in such a way that the gap arrives periodically according to measurement configuration information received from a base station eNB.

Further, the base station eNB obtains in advance timings at which the user apparatus UE performs measurements, and thus, the base station eNB stops DL/UL scheduling during the measurement period.

In LTE Rel-10 or later, CA (carrier aggregation) and DC (dual connectivity) are introduced for improving throughput by bundling multiple CCs (component carriers). In 3GPP, it is defined that a user apparatus UE applies a single gap setting to all CCs at the time of CA/DC. In other words, as illustrated in FIG. 1 in which a PCell and an SCell corresponding to multiple CCs are included, a user apparatus UE stops DL reception/UL transmission in all CCs during the gap period. The above operation of a user apparatus UE is defined because implementation of a user apparatus becomes complex if a gap is defined for each CC.

It should be noted that a new generation mobile communication system referred to as 5th generation (hereinafter, referred to as 5G) has been discussed in order to realize dramatically high system performance compared with an existing mobile communication system, which is required for mobile communications. In 5G, taking into account advancement and diversification in service requirements and dramatic increase in predicted traffic, multiple performance targets are listed such as larger capacity, higher data transmission speed, lower data transmission latency, simultaneous connectivity of significant number of terminals, lower cost, and lower energy consumption. In 5G, it is desired that various requirements, which cannot be achieved by an existing mobile communication system, will be fulfilled.

It should be noted that it is assumed that the existing mobile communication system refers to an LTE system defined in Rel-8 or later, or refers to an LTE-Advanced system defined in Rel-10 or later. In the following, they are collectively referred to as 4G.

In 5G, in order to realize the target performance by achieving dramatic performance improvement compared with 4G, an enhanced LTE RAT (Radio Access Technology) and a new RAT have been discussed. The enhanced LTE RAT is an enhancement from 4G technologies, in which it is assumed that operations are performed mainly in an existing frequency band. In the new RAT, it is assumed that operations are performed mainly in a frequency band higher than the existing frequency band. It is expected that a dramatic advancement will be realized by combining the enhanced LTE RAT and the new RAT.

CITATION LIST

Non-Patent Literature

[NPL 1] 3GPP TS36.331 V12.6.0 (2015-06)
[NPL 2] 3GPP TS36.133 V12.8.0 (2015-07)

SUMMARY OF THE INVENTION

Technical Problem

In order to realize lower latency, which is one of the 5G requirements, it is assumed that a TTI (Transmission Time Interval) in 5G will be made shorter than that in 4G so that an RTT (Round Trip Time) in 5G will be shorter than that in 4G.

It is assumed that, during an initial 5G introduction period, 5G will not be operated alone but will be operated in cooperation with 4G. As a result, it is assumed that it is necessary for a user apparatus UE to simultaneously communicate with systems with different TTIs (TTI lengths). For example, CA and DC between 4G/5G can be considered as an example. In this case, it is assumed that a user apparatus UE perform communications by using CCs with different TTIs simultaneously.

However, in the current measurement specifications, it is assumed that operations are performed with a single TTI. In other words, measurement operations, in which there exist different TTIs, are not guaranteed in the current measurement specifications, and thus, there is a possibility that operations cannot be performed appropriately in the case where there exist different TTIs.

Further, for example, in current gap-related specifications, various conditions are determined by using a TTI as a reference. In the case where there exist different TTIs, it is not clear which TTI should be used as a reference by a user apparatus UE. As a result, misunderstanding related to gap configurations may occur between a user apparatus UE and a network NW.

Further, in the case where a TTI is short, it is considered that a period required for measurement corresponding to an object will be shorter than that of a case in which a TTI is long. As a result, there is a possibility that efficient measurement cannot be performed according to the current measurement-related specifications.

The present invention has been made in view of the above. It is an object of the present invention to provide a technique which enables appropriately setting a gap in a mobile communication system in which there exist different TTIs.

Solution to Problem

According to an embodiment, a user apparatus is provided. The user apparatus performs communications with a base station in a mobile communication system in which at least two carriers with different TTIs are used. The user apparatus includes a gap control unit configured to set a gap which is a period during which the user apparatus does not perform communications with the base station. The gap control unit sets a gap common to a gap set for one of the two carriers as a gap for the other of the two carriers.

Further, according to an embodiment, a user apparatus is provided. The user apparatus perform communications with a base station in a mobile communication system in which at least two carriers with different TTIs are used. The user apparatus includes a gap control unit configured to set a gap that is a period during which the user apparatus does not perform communications with the base station.

In the case where the gap control unit receives a gap configuration indication for one of the two carriers, the gap control unit sets a gap for the other of the two carriers based on the gap configuration indication.

Further, according to an embodiment, a gap configuration method is provided. The gap configuration method is performed by a user apparatus that performs communications with a base station in a mobile communication system in which at least two carriers with different TTIs are used. The gap configuration method includes setting a gap which is a period during which the user apparatus does not perform communications with the base station.

In the setting, the user apparatus sets a gap common to a gap set for one of the two carriers as a gap for the other of the two carriers.

Further, according to an embodiment, a gap configuration method is provided. The gap configuration method is performed by a user apparatus that perform communications with a base station in a mobile communication system in which at least two carriers with different TTIs are used. The gap configuration method includes setting a gap which is a period during which the user apparatus does not perform communications with the base station.

In the setting, in the case where the user apparatus receives from the base station a gap configuration indication for one of the two carriers, the user apparatus sets a gap for the other of the two carriers based on the gap configuration indication.

Further, according to an embodiment, a base station is provided. The base station performs communications with a user apparatus in a mobile communication system in which at least two carriers with different TTIs are used. The base station includes a gap indication unit configured to transmit an indication related to a gap which is a period during which the user apparatus does not perform communications with the base station.

The gap indication unit transmits an indication indicating a first gap operation or a second gap operation to the user apparatus.

In the case where the user apparatus receives an indication indicating the first operation, the user apparatus sets a gap common to a gap set for one of the two carriers with a longer TTI as a gap for the other of the two carriers with a shorter TTI.

In the case where the user apparatus receives an indication indicating the second operation, the user apparatus set a gap common to a gap set for one of the two carriers with a shorter TTI as a gap for the other of the two carriers with a longer TTI.

Advantageous Effects of Invention

According to an embodiment, it is possible to appropriately set a gap in a mobile communication system in which there exist different TTIs.

DETAILED DESCRIPTION OF THE PREFERRED EMBODIMENTS

Figure 1:
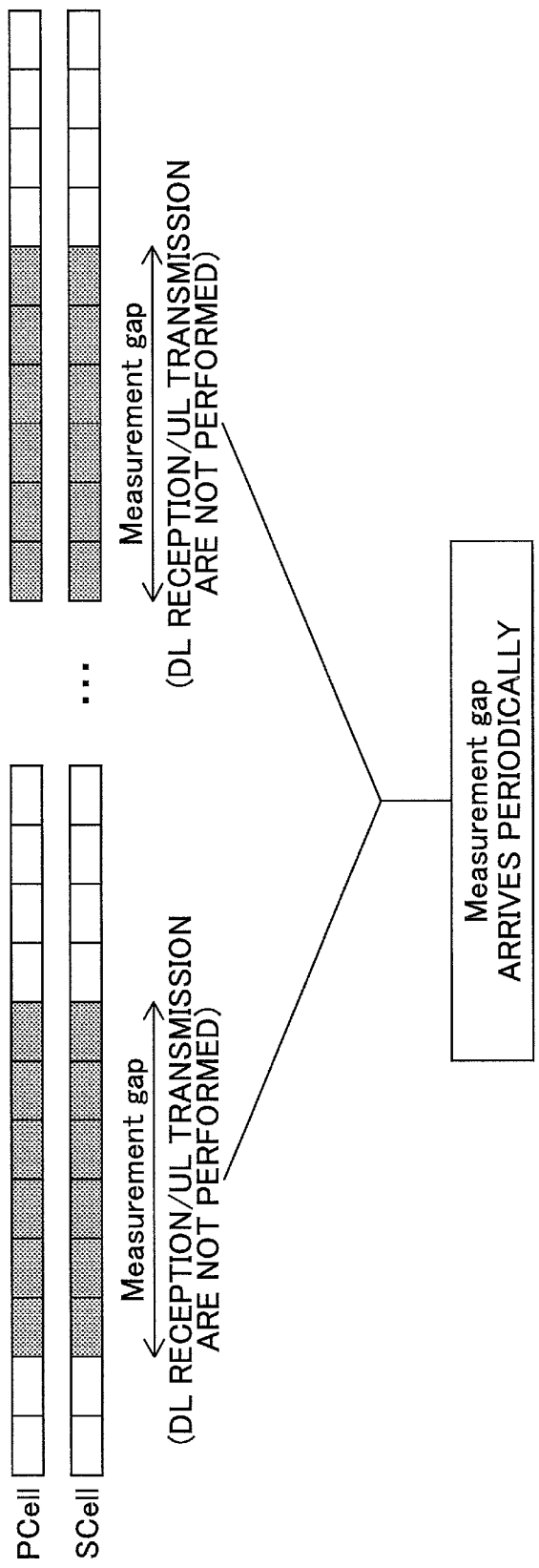
FIG. 1 is a drawing illustrating a measurement gap in CA/DC.

In the following, referring to the drawings, embodiments of the present invention will be described. The embodiments described below are merely examples and embodiments to which the present invention is applied are not limited to the following embodiments. For example, it is assumed that a mobile communication system according to an embodiment complies with 4G and 5G. However, the present invention can be applied, not only to 4G and 5G, but also to other schemes.

Further, CA (carrier aggregation) terms according to an embodiment include meanings of, not only Intra-eNB CA, but also Inter-eNB CA such as DC (dual connectivity). In the case of distinguishing Intra-eNB CA and Inter-eNB CA, Intra-eNB CA is referred to as intra-base-station CA and Inter-eNB CA is referred to as inter-base-station CA. It should be noted that there is a case in which a term CA/DC is used in order to indicate that "CA" includes "DC".

Further, according to an embodiment, a CC (component carrier) is basically the same as a cell, and a CC may be referred to as a cell (more specifically, a serving cell).

(Entire System Configuration, Operation Overview)

Figure 2:
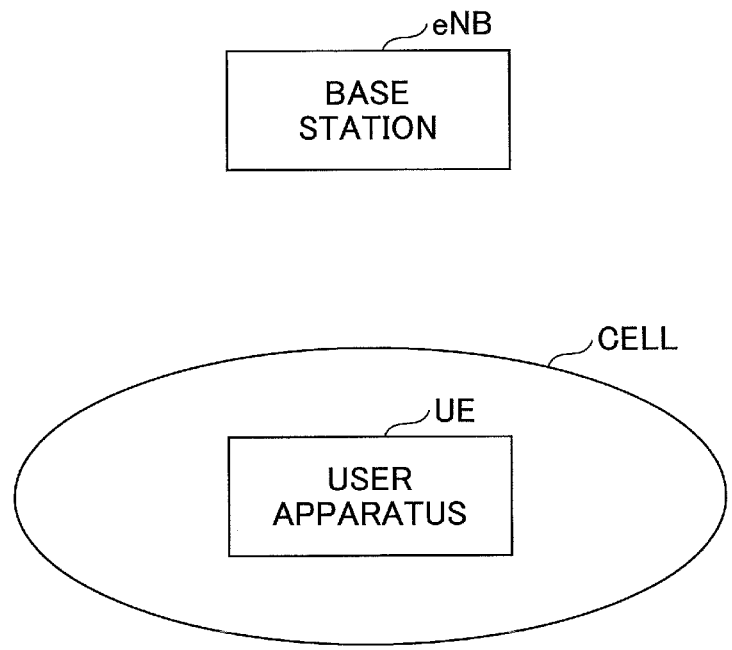
FIG. 2 is a drawing illustrating a configuration example of a communication system according to an embodiment.

FIG. 2 illustrates a configuration diagram of a communication system according to an embodiment.

As illustrated in FIG. 2, the communication system according to an embodiment includes a user apparatus UE and a base station eNB. In the communication system, intra-base-station CA is supported. In the following, "user apparatus UE" is described as UE, and "base station eNB" is described as eNB.

There are a single UE and a single eNB illustrated in FIG. 2. However, this is just an example. There may be multiple UEs and eNBs. Further, in the case of applying intra-base-station CA, multiple cells may be formed by an eNB alone, or multiple cells may be formed by an eNB body and an RRE by connecting, for example, a remote RRE (remote radio equipment).

When CA is performed, a PCell (primary cell) with high reliability for securing connectivity and an SCell (secondary cell) are set (configured) for a UE. The UE is first connected to a PCell, and, if necessary, an SCell can be added. The PCell is the same as a single cell which supports RLM (radio link monitoring) and SPS (semi-persistent scheduling), etc. Adding and removing of an SCell are performed by RRC (radio resource control) signaling.

Figure 3:
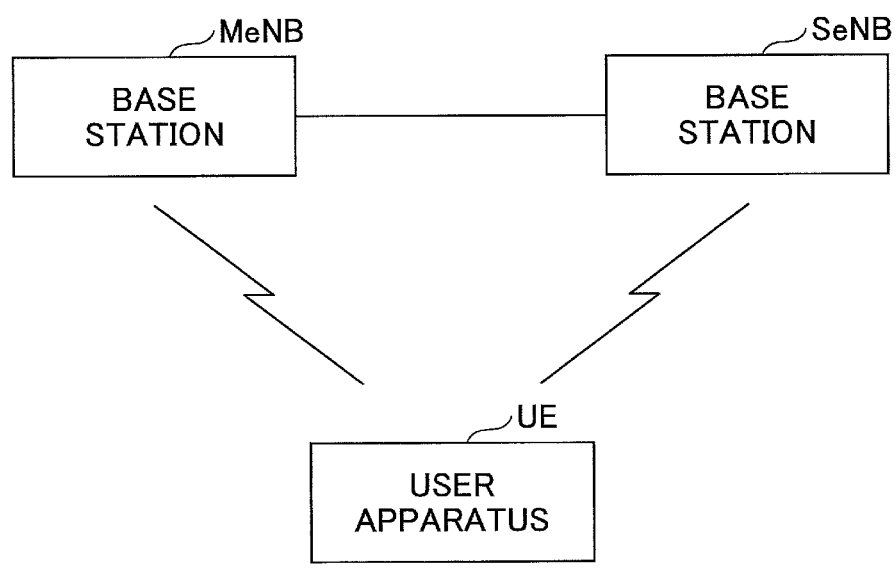
FIG. 3 is a drawing illustrating another configuration example of a communication system according to an embodiment.

FIG. 3 is a structure diagram of a communication system in the case where DC is performed according to an embodiment. As illustrated in FIG. 3, in this case, there are a base station MeNB (hereinafter, MeNB) and a base station SeNB (hereinafter, SeNB), which enables DC for the UE. Further, communications are available between an MeNB and an SeNB via, for example, an X2 interface.

In DC, a cell group including (one or multiple) cells under the MeNB is referred to as an MCG (master cell group), and a cell group including (one or multiple) cells under the SeNB is referred to as an SCG (secondary cell group). A PCell is set within the MCG. Further, a UL CC is set in at least one SCell in the SCG, and, a PUCCH is set in one of the SCells. Such an SCell is referred to as a PSCell (primary SCell).

According to an embodiment, it is assumed that an environment is formed in any one of the cases of FIG. 2 and FIG. 3, in which environment there exist different TTIs. The "environment in which there exist different TTIs" is, for example, an environment in which CA is performed by using a CC with a 4G-TTI and a CC with a 5G-TTI. The "5G" in this case may be an enhanced LTE RAT or a new RAT.

Further, the "environment in which there exist different TTIs" may be an environment in which CA is performed by using a CC with a 5G (enhanced LTE RAT)-TTI and a CC with a 5G (new RAT)-TTI.

Further, the "environment in which there exist different TTIs" may be an environment in which there exist a CC with a 4G-TTI, a CC with a 5G (enhanced LTE RAT)-TTI, and a CC with a 5G (new RAT)-TTI, or a case in which there exist a CC with a 4G-TTI, a CC with a 5G (enhanced LTE RAT)-TTI, and a CC with a 5G (new RAT)-TTI by using a technique other than CA/DC.

Further, the "environment in which there exist different TTIs" may refer to a case in which there exist CCs with different TTIs in the same RAT, or may refer to a case in which there exist CCs with different TTIs between different RATs. Further, the "environment in which there exist different TTIs" may refer to a case in which there exist CCs with different TTIs temporarily in the case where a TTI of a certain CC changes according to time. It should be noted that the number of types of TTIs that exist may be two, three, or more.

Further, the gap according to an embodiment may refer to a period provided for measuring a measurement target, or may refer to a period in which at least one of transmission and reception of a UE is prohibited.

In the case where the gap refers to a "period provided for measuring a measurement target", the measurement target may be a cell of a frequency other than the frequency used for current communications in the same RAT, or may be a cell of a RAT other than the RAT used for current communications. Further, the measurement target may not be a cell that can be uniquely identified by a Cell ID, etc.

Further, the "TTI" according to an embodiment is a minimum time unit of scheduling, and a period of the TTI may be referred to as a "subframe". For each subframe, a resource (e.g., RB (resource block)) is allocated to a UE selected by the scheduling.

Figure 4:
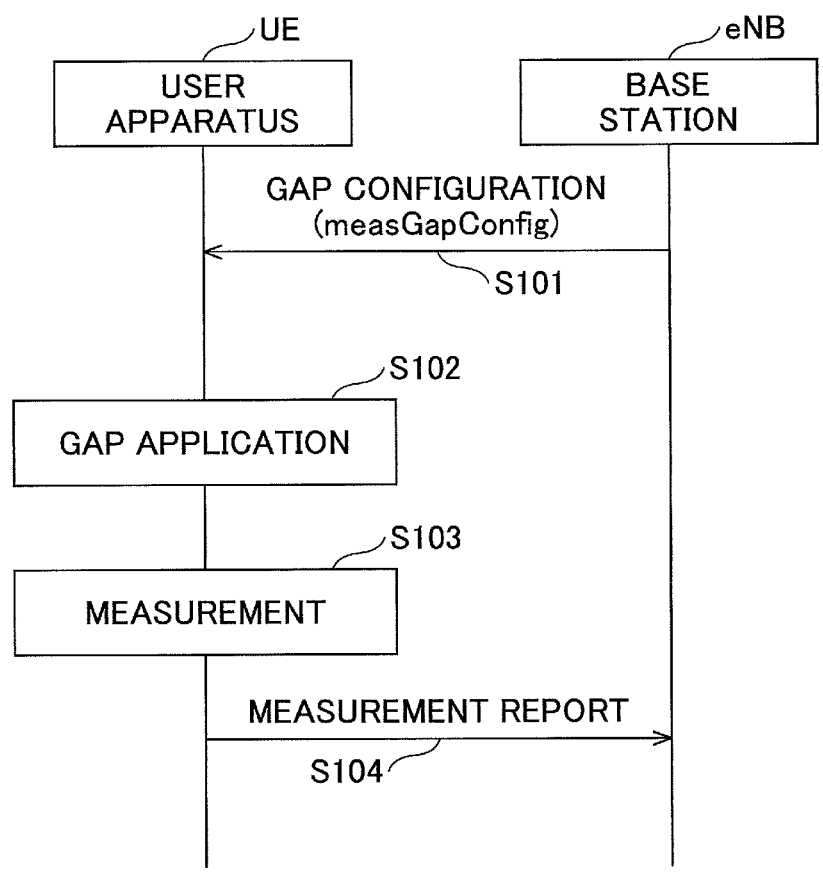
FIG. 4 is a drawing illustrating an operation example of the communication system related to a gap.

Here, a processing operation related to a gap mainly used for measurement will be described according to an embodiment. Therefore, a basic operation example (an operation example of 4G) related to measurement will be described while making reference to FIG. 4. Although FIG. 4 illustrates an operation related to the configuration of FIG. 2, the similar operation is performed by an MeNB (or an SeNB) in the configuration of FIG. 3.

First, an eNB performs gap configuration (setting) for a UE (step S101). More specifically, the setting is realized by using, for example, an information element (measGapConfig) of Measurement Configuration in an RRCConnectionReconfiguration message. A time length of a gap is, for example, 6 ms (6 subframes in 4G-TTI), and a cycle (gap pattern, e.g., 40 ms or 80 ms) and an offset (gapOffset) are specified by using the measGapConfig.

The UE, in which the gap configuration is set, applies a gap according to the configuration (step S102). It should be noted that "applying a gap" in the UE may be referred to as "configuring (setting) a gap". More specifically, the UE stops DL and UL transmission and reception in the gap which starts from an SFN/subframe number calculated from the above-described cycle (MGRP) and the offset. The UE performs measurement during the gap period (step S103) and transmits a measurement report (step S104).

In the following, the above-described operation examples for solving the problem will be described. In the following operation examples, it is assumed, as an example, that the "environment in which there exist different TTIs" is an environment in which CA is performed by using a CC with a 4G-TTI and a CC with a 5G-TTI. Further, it is assumed that the gap is a period provided for measuring a measurement target. Further, the configuration of the communication system may be the one in FIG. 2 (intra-base-station CA) or the one in FIG. 3 (DC). It is assumed in the operation examples that the configuration of the communication system is the one in FIG. 2. In order to indicate that the same applies to the case of FIG. 3, expressions such as "a signal is transmitted from an eNB (MeNB or SeNB)" will be used as necessary in the case where "a signal is transmitted from a base station".

Further, in the following, there may be a case in which a period of a TTI is referred to as a "subframe". It should be noted that lengths of "subframes" are also different between CCs with different TTIs.

Further, although it is assumed that the number of different TTIs is two in the following description, even in the case where the number of different TTIs is three or more, the same operation described below may be also performed between certain two TTIs.

Further, although mainly a UE operation will be described in the following, also, an eNB performs gap configuration (setting) in the similar way as the UE does, and does not perform scheduling during the gap period in each operation example.

Operation Example 1

In an operation example 1, the UE sets a gap common to a gap for a CC with a longer TTI as a gap for a CC with a shorter TTI.

Figure 5:
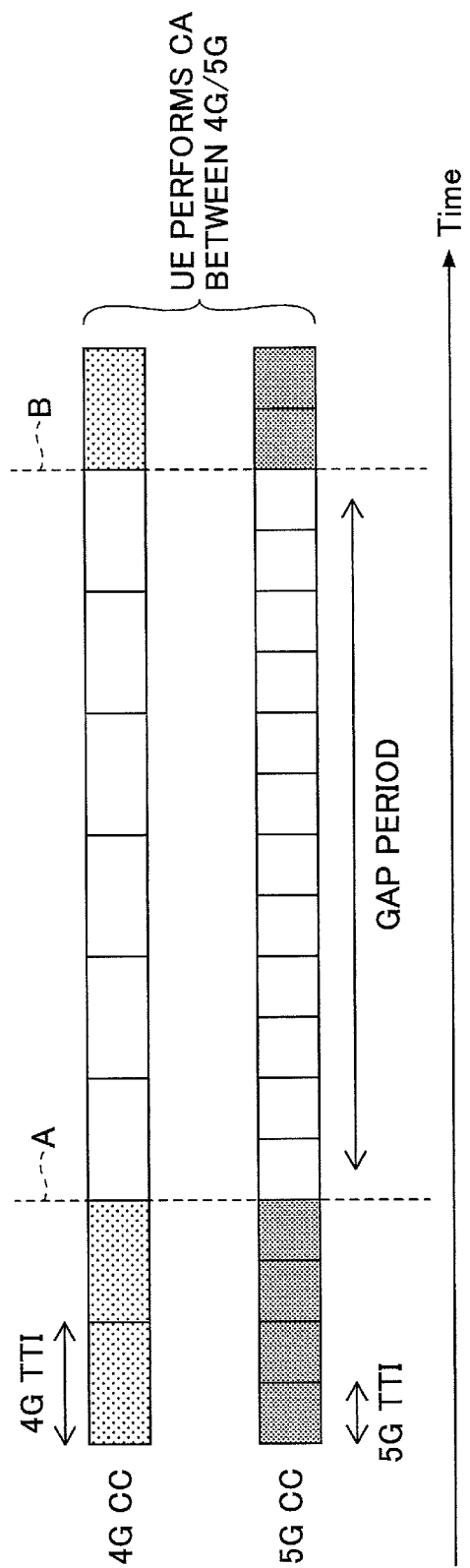
FIG. 5 is a drawing illustrating an operation example 1.

For example, in the case where the UE and the eNB (MeNB, SeNB) perform CA by using a 4G-CC and a 5G-CC, the UE sets a gap for the 5G-CC in accordance with a period specified for the 4G-CC as illustrated in FIG. 5 (e.g., 4G-TTI*6). In other words, in the case where the UE sets a period between A and B in the 4G-CC with a longer TTI as a gap, the UE also sets the same period between A and B in the 5G-CC as a gap (period in which communications are not performed).

It should be noted that the 5G-TTI is 0.5 ms in the operation example 1, which is only an example. Regarding other operation examples, TTI lengths illustrated in the figures are only examples.

In the operation example 1, measurement characteristics in 4G are maintained, and thus, it is possible to provide CA by using a 4G-CC and a 5G-CC without degrading the mobility quality or the like in an existing NW when compared with mobility quality or the like in an existing NW (NW with 4G alone), Operation Example 2

Next, an operation example 2 will be described. In the operation example 2, the UE sets a gap common to a gap for a CC with a shorter TTI as a gap for a CC with a longer TTI.

For example, in the case where the UE and the eNB (MeNB, SeNB) perform CA by using a 4G-CC and a 5G-CC, the UE sets a gap for the 4G-CC in accordance with a period specified for the 5G-CC (e.g., 5G-TTI*6).

In the operation example 2, there are an option 1 and an option 2 as operations related to the CC with a longer TTI.
<Option 1>
In the option 1, in the case where the UE detects that a period of a gap for the CC with a shorter TTI (hereinafter, referred to as (2)) is shorter than a period of a gap for the CC with a longer TTI (hereinafter, referred to as (1)), it is assumed that the UE does not consider a period of (1) which does not overlap with (2) as a gap in the CC with a longer TTI. In the period the UE does not consider as a gap, it is possible for the UE to perform UL transmission/DL reception.

Figure 6:
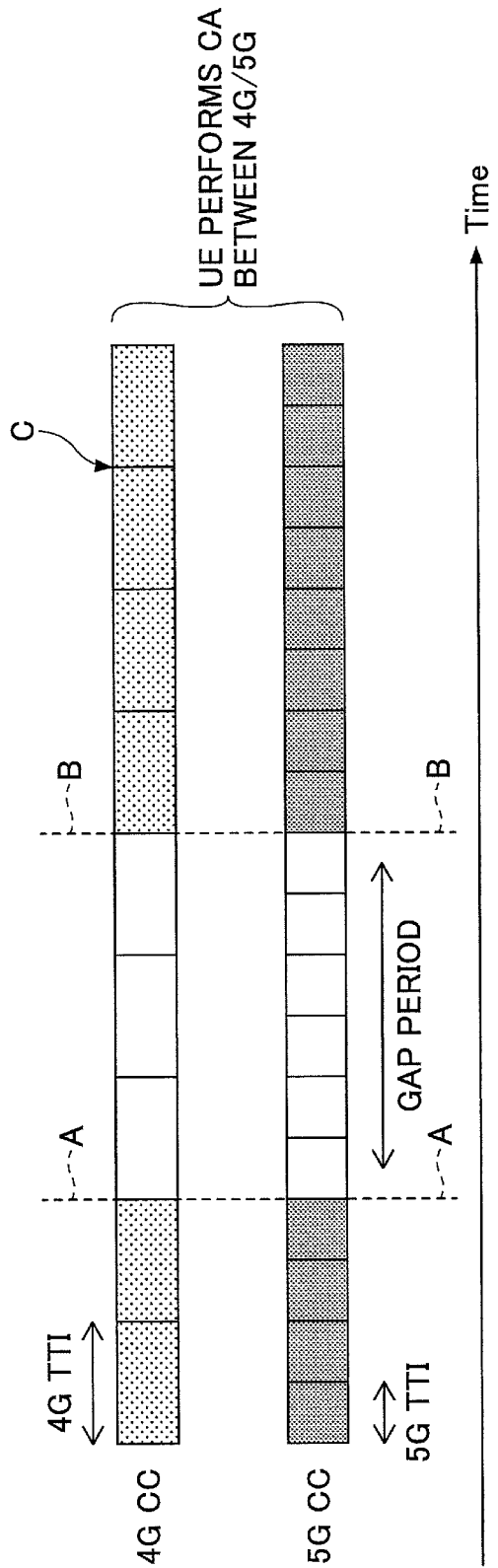
FIG. 6 is a drawing illustrating an option 1 of an operation example 2.

A specific example of the option 1 is illustrated in FIG. 6. In an example illustrated in FIG. 6, the UE sets a gap for the 4G-CC in accordance with a period specified for the 5G-CC (e.g., 5G-TTI*6). In other words, in the case where the UE sets a period between A and B in the 5G-CC with a shorter TTI as a gap, the UE also sets the same period between A and B in the 4G-CC as a gap. Further, for example, even if a period between A and C is set as a gap for the 4G-CC, the UE does not consider a period between B and C as a gap.
<Option 2>
In an option 2, the UE considers a period of (1) which does not overlap with (2) as a gap for the CC with a longer TTI in the case described in the option 1.

Figure 7:
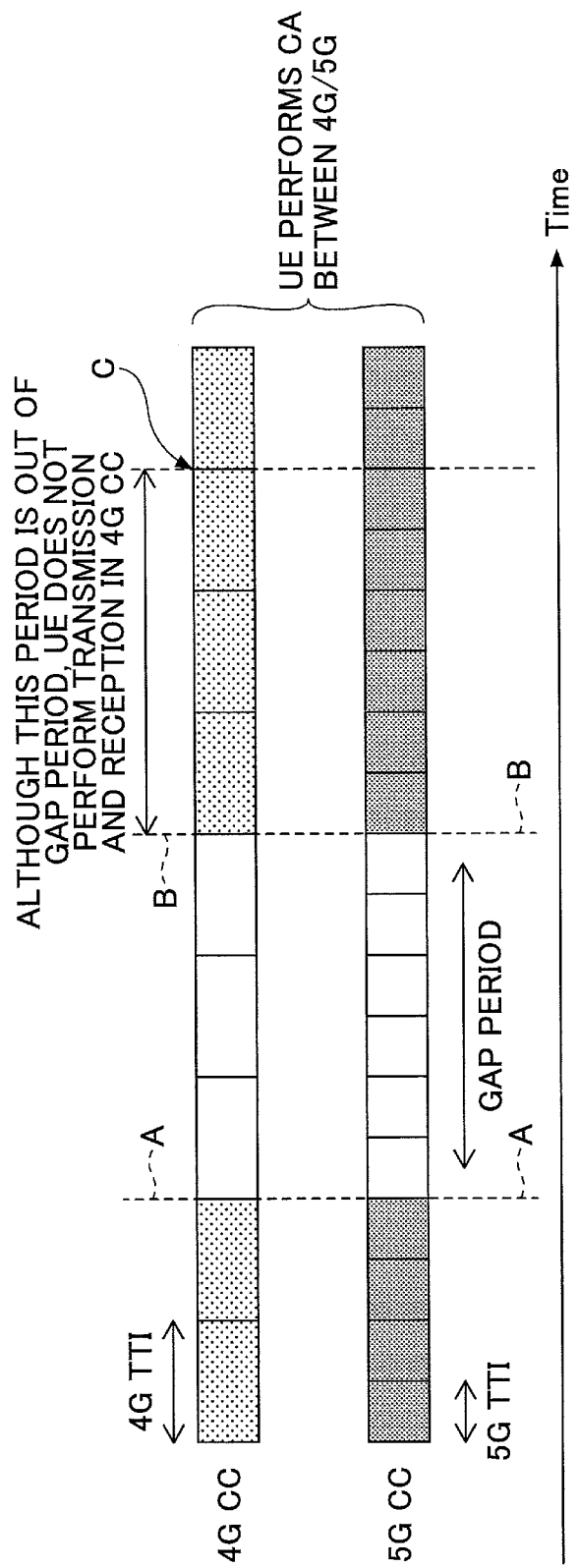
FIG. 7 is a drawing illustrating an option 2 of the operation example 2.

A specific example of the option 2 is illustrated in FIG. 7. In the case where the UE sets a period between A and B in the 5G-CC with a shorter TTI as a gap, the UE sets the same period between A and B in the 4G-CC as a gap also in an example illustrated in FIG. 7. Further, the UE considers a period between B and C as a gap. Therefore, the UE does not perform 4G-CC transmission and reception during the period between B and C.

In the case of the option 2, although communication opportunities will be decreased in the CC with a longer TTI compared with the option 2, it is possible to realize a simple operation implementation because the same operation will be performed by the UE for the CC with a longer TTI regardless of existence and non-existence of the CC with a shorter TTI.

According to the operation example 2 including the options 1 and 2, it is possible to maximize communication opportunities in 5G because it is possible for the UE to set a gap optimized for 5G. Therefore, faster communications are available. For example, in the case where the UE exists near the center of a 4G cell and it is not necessary to perform measurement for 4G mobility, faster communications may be available without degrading mobility characteristics.

Regarding Selection of the Operation Example 1 and the Operation Example 2

The UE may determine autonomously which of the operation example 1 and the operation example 2 is to be performed by the UE, or may determine the operation based on an indication from the eNB (MeNB or SeNB).

For example, in the case where the UE receives a specific indication from the eNB (MeNB or SeNB), the UE determines which of the operation example 1 and the operation example 2 is to be performed by the UE, and, in the case where the specific indication is not received, the UE determines the operation autonomously.

The eNB (MeNB or SeNB) may transmit the indication by using an RRC message, or by using MAC CE, PDCCH, or other signals.

Further, the indication may be an explicit indication or an implicit indication. As an explicit indication, there is, for example, an indication indicating an operation to be performed (the operation example 1 or the operation example 2).

Further, as a case of an implicit indication, in the case where the UE receives only one of the gap configuration (setting) information items of the 4G-CC and the 5G-CC from the eNB (MeNB or SeNB) (in the case where the eNB transmits only one of the gap configuration (setting) information items), the UE sets a gap by using the CC corresponding to the received gap configuration (setting) information item as a reference. In other words, the UE performs the operation example 1 in the case where the UE receives only a gap configuration (setting) information item for the 4G-CC from the eNB (MeNB or SeNB), and performs the operation example 2 in the case where the UE receives only a gap configuration (setting) information item for the 5G-CC from the eNB (MeNB or SeNB).

Further, as a case of an implicit indication, for example, in the case where the UE receives both of the gap configuration (setting) information items of the 4G-CC and the 5G-CC from the eNB (MeNB or SeNB) (in the case where the eNB transmits both of the gap configuration (setting) information items), the UE sets a gap according to a predetermined reference. As an example related to "predetermined reference", the UE sets a gap by using the CC with the shortest TTI, of multiple CCs corresponding to received gap configuration (setting) information items, as a reference (operation example 2), or, by using the CC with the longest TTI as a reference (operation example 1).

In the case where the UE autonomously determines the operation, a determination method is not limited to a specific method. As an example method, the UE may set a gap by using a CC with a TTI the same as (or the closest to) the TTI of a measurement target cell. In the case where the UE determines the operation autonomously, the UE transmits a determination result to the eNB (MeNB or SeNB).

Regarding Modified Examples of the Operation Examples 1 and 2

In the operation examples 1 and 2, gap start points/end points match between CCs in all CCs with different TTIs. For example, in FIG. 5, gap start points A match between the 4G-CC and the 5G-CC, and gap end points B also match between the 4G-CC and the 5G-CC. However, there is a case in which gap start/end points do not match between CCs. It should be noted that "match" may not mean "match" in the strict meaning. For example, two points may be considered to match if the two points are as close as a predetermined threshold value or less.

Examples of a case in which gap start/end points do not match between CCs are illustrated in FIG. 8 to FIG. 11. It should be noted that, although examples of a case are illustrated in which a gap of the CC with a shorter TTI (5G-GAP) is used as a reference in FIG. 8 to FIG. 11, there is also a similar case in which the CC with a longer TTI is used as an reference. Further, a TTI timing may be a timing at the time of UE reception, or a timing at the time of eNB transmission.

Figure 8:
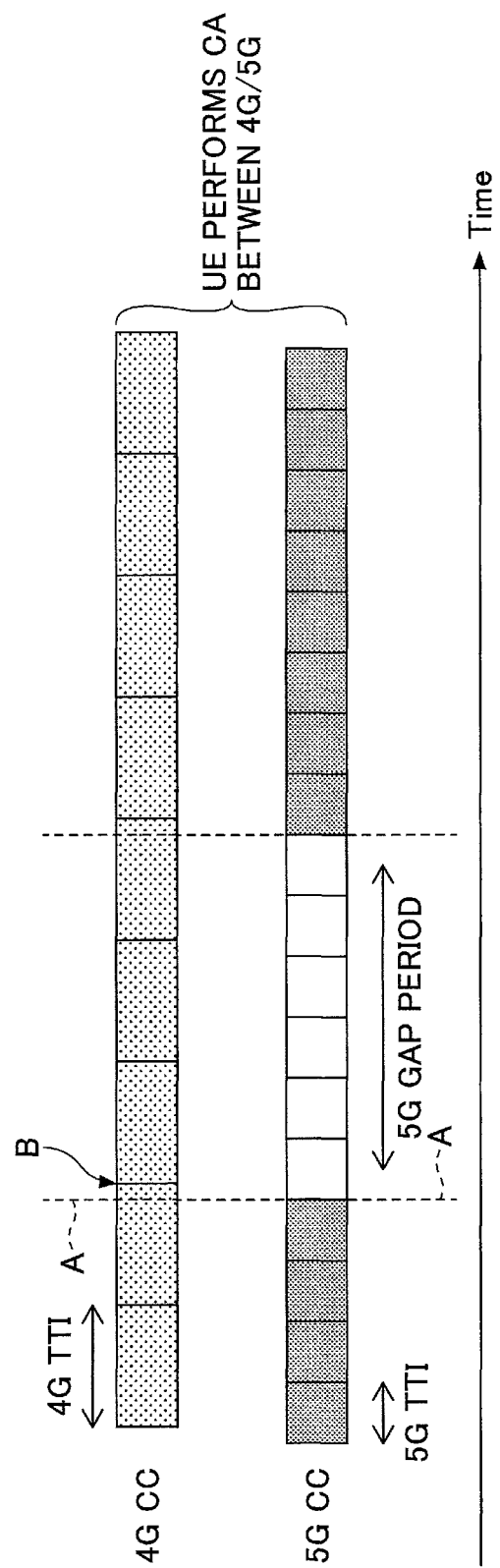
FIG. 8 is a drawing illustrating an example of a case in which TTI timings do not match between a CC with a shorter TTI and a CC with a longer TTI.

FIG. 8 illustrates a case in which TTI timings do not match between the CC with a shorter TTI and the CC with a longer TTI. As illustrated in FIG. 8, a gap start point A of the 5G-CC does not match a start point B of the 4G-CC TTI (subframe). Similarly, a gap end point of 5G-CC does not match an end point of 4G-CC TTI. In this example, asynchronous DC is assumed in which reception timings are not synchronized between CCs.

Figure 9:
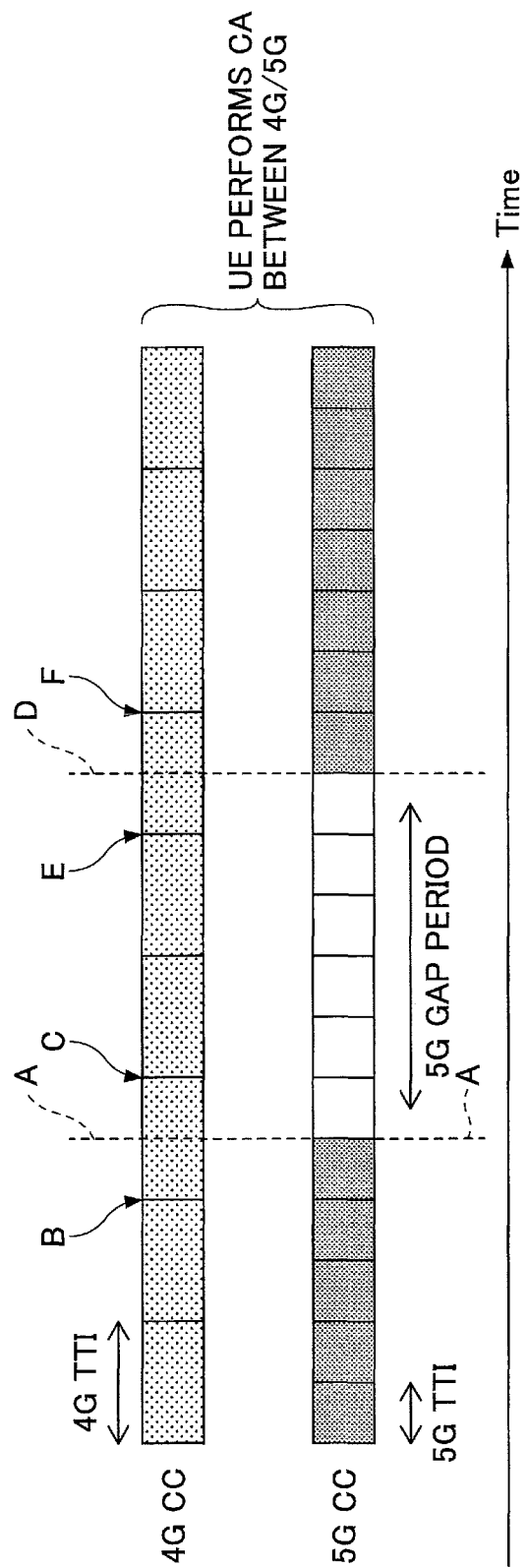
FIG. 9 is a drawing illustrating an example of a case in which a start/end point of a gap based on a CC with a shorter TTI does not match a start/end point of a gap based on a CC with a longer TTI.

FIG. 9 illustrates an example of a case in which a start/end point of a gap based on the CC with a shorter TTI does not match a start/end point of a TTI of the CC with a longer TTI. As illustrated in FIG. 9, a gap start point A of the 5G-CC does not match any one of a start point B and an end point C of a TTI of the 4G-CC. Similarly, a gap end point D of the 5G-CC does not match any one of a start point E and an end point F of a TTI of the 4G-CC.

Figure 10:
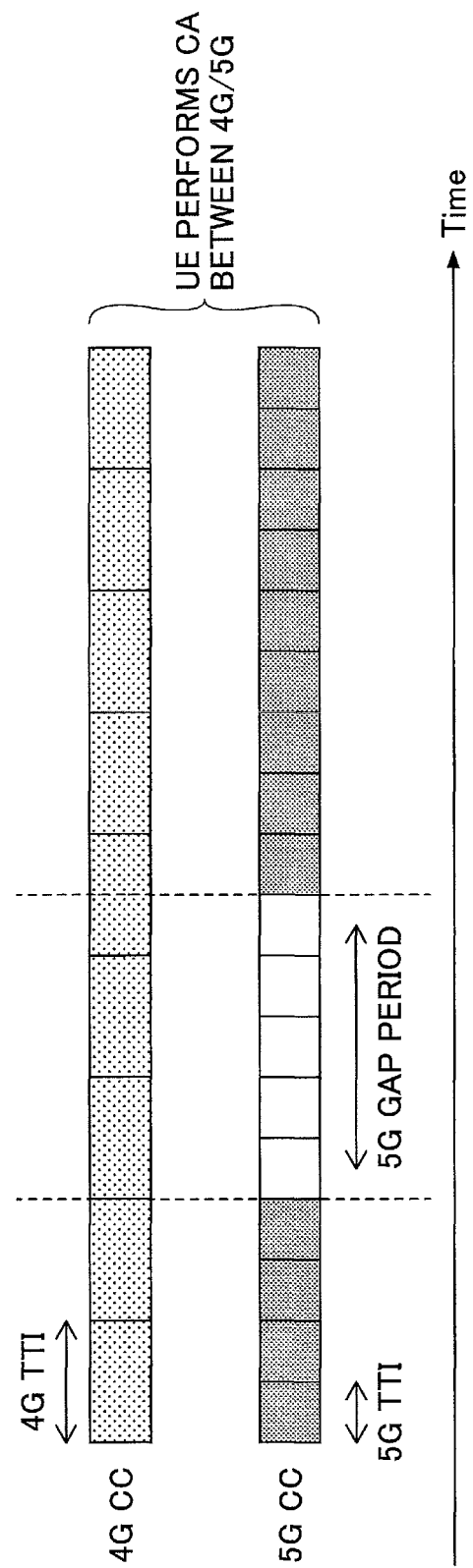
FIG. 10 is a drawing illustrating an example of a case in which a length of a gap based on a CC with a shorter TTI does not match an integer multiple of a length of a TTI of a CC with a longer TTI.

FIG. 10 illustrates an example of a case in which a length of a gap based on the CC with a shorter TTI does not match an integer multiple of a length of a TTI of the CC with a longer TTI. For example, when the length of a gap in the 4G-CC is 4G-TTI*6 (e.g., 6 ms), in an example of FIG. 10, the length of a gap in the 5G-CC is 5G-TTI*5 (e.g., 2.5 ms). Therefore, the length of a gap in the 5G-CC does not match an integer multiple of the length of a TTI in the 4G-CC.

Figure 11:
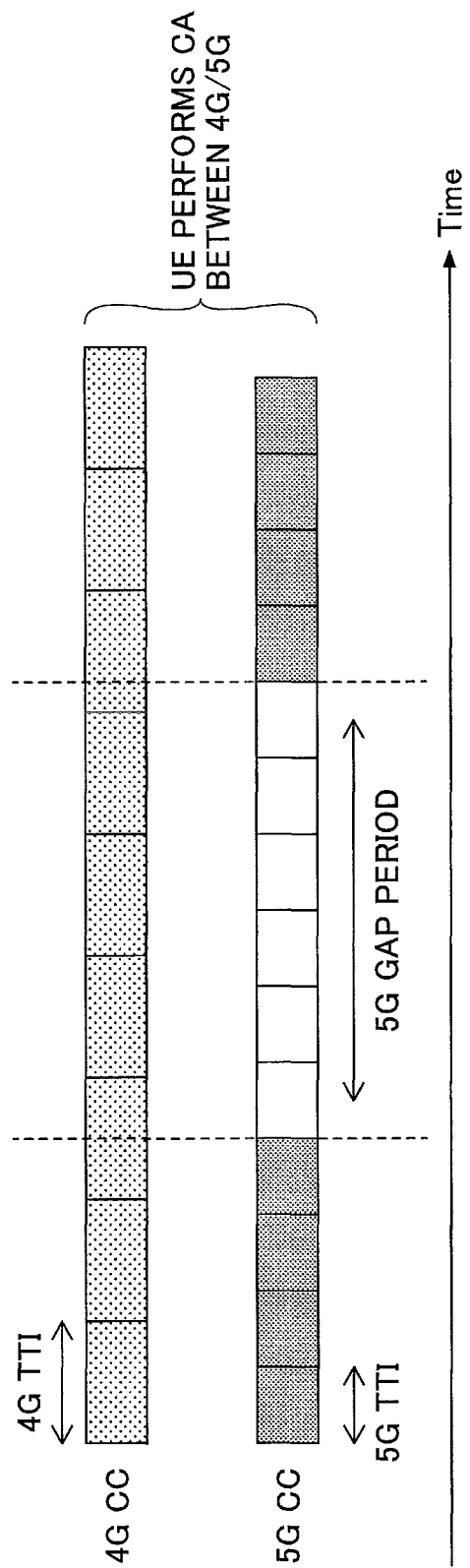
FIG. 11 is a drawing illustrating an example of a case in which an integer multiple of a TTI of a CC with a shorter TTI does not match a TTI of a CC with a longer TTI.

FIG. 11 illustrates an example of a case in which an integer multiple of a TTI of the CC with a shorter TTI does not match a TTI of the CC with a longer TTI. As illustrated in FIG. 11, a 5G-CC TTI is slightly longer than a half of a 4G-CC TTI. As a result, an integer multiple of a 5G-CC TTI does not match a 4G-CC TTI.

In the above-described examples, for example, in a case illustrated in FIG. 9, the UE sets as a gap a period between A and D in the 4G-CC of FIG. 9. The gap start point A is in the middle of a TTI between B and C in the 4G-CC. As a result, for example, although the UE receives UL transmission/DL reception allocation in the 4G-CC during a period between A and B, the UE may not perform allocated UL transmission/DL reception. In this case, for example, there is a possibility that an error may occur in HARQ control between the eNB and the UE, etc. There is a possibility that a similar problem may occur with respect to an end point side of a gap in the 4G-CC. This kind of problem may occur in general in the case where gap start/end points between CCs with different TTIs do not match as described in the above examples.

Therefore, in a modified example, a method is used in which it is possible to perform normal communications even in the case where gap start/end points do not match between CCs with different TTIs. Specific examples will be described in the following as a modified example 1 and a modified example 2.

Modified Example 1 of the Operation Examples 1 and 2

In the modified example 1, when the UE detects that there is a TTI that partially overlaps with a gap between CCs with different TTIs, the UE does not perform communications in the entire TTI in the CC to which the TTI belongs.

A specific example of the modified example 1 based on the operation example 2 will be described while making reference to FIG. 12. If the operation example 2 is used as is, then a period between B and E in the 4G-CC will be a gap. However, in the modified example 1, the UE detects that a TTI between A and C in the 4G-CC partially overlaps with the gap (a TTI between A and C includes a gap start point B), and the entire TTI between A and C will be a period in which communications are not performed. Similarly, the entire TTI between D and F will be a period in which communications are not performed.

Figure 12:
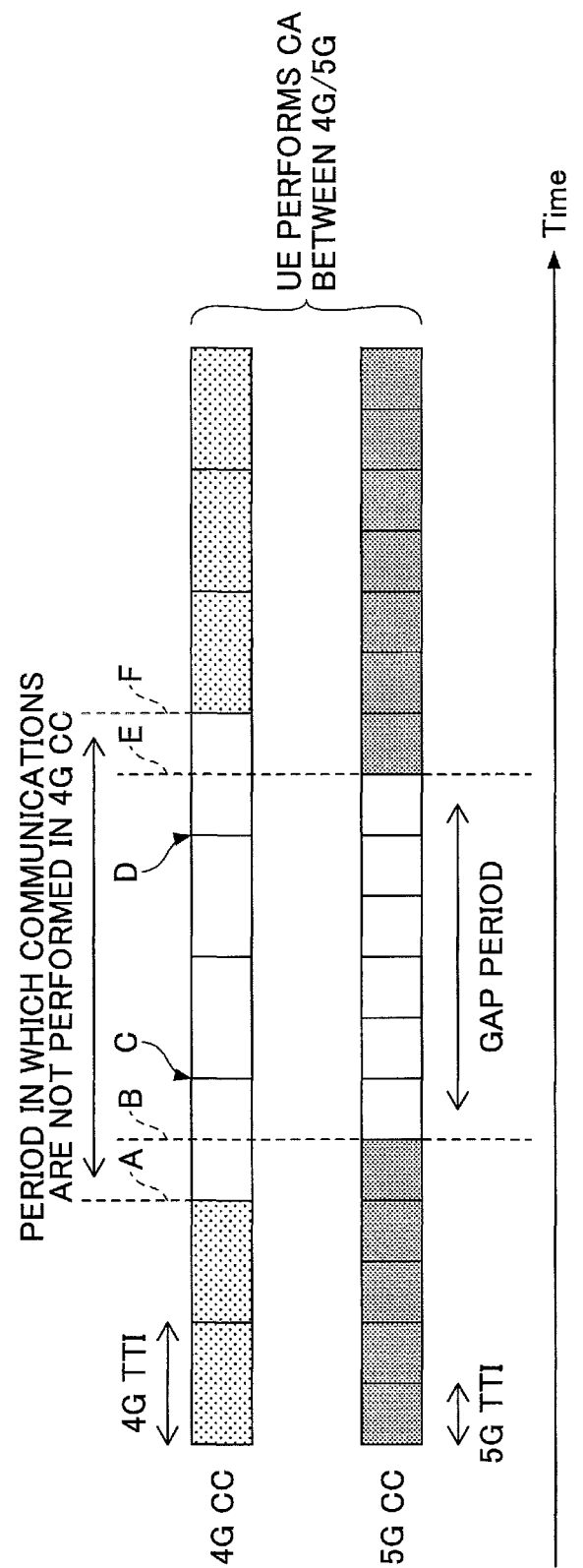
FIG. 12 is a drawing illustrating a modified example 1 of the operation examples 1 and 2.
Figure 13:
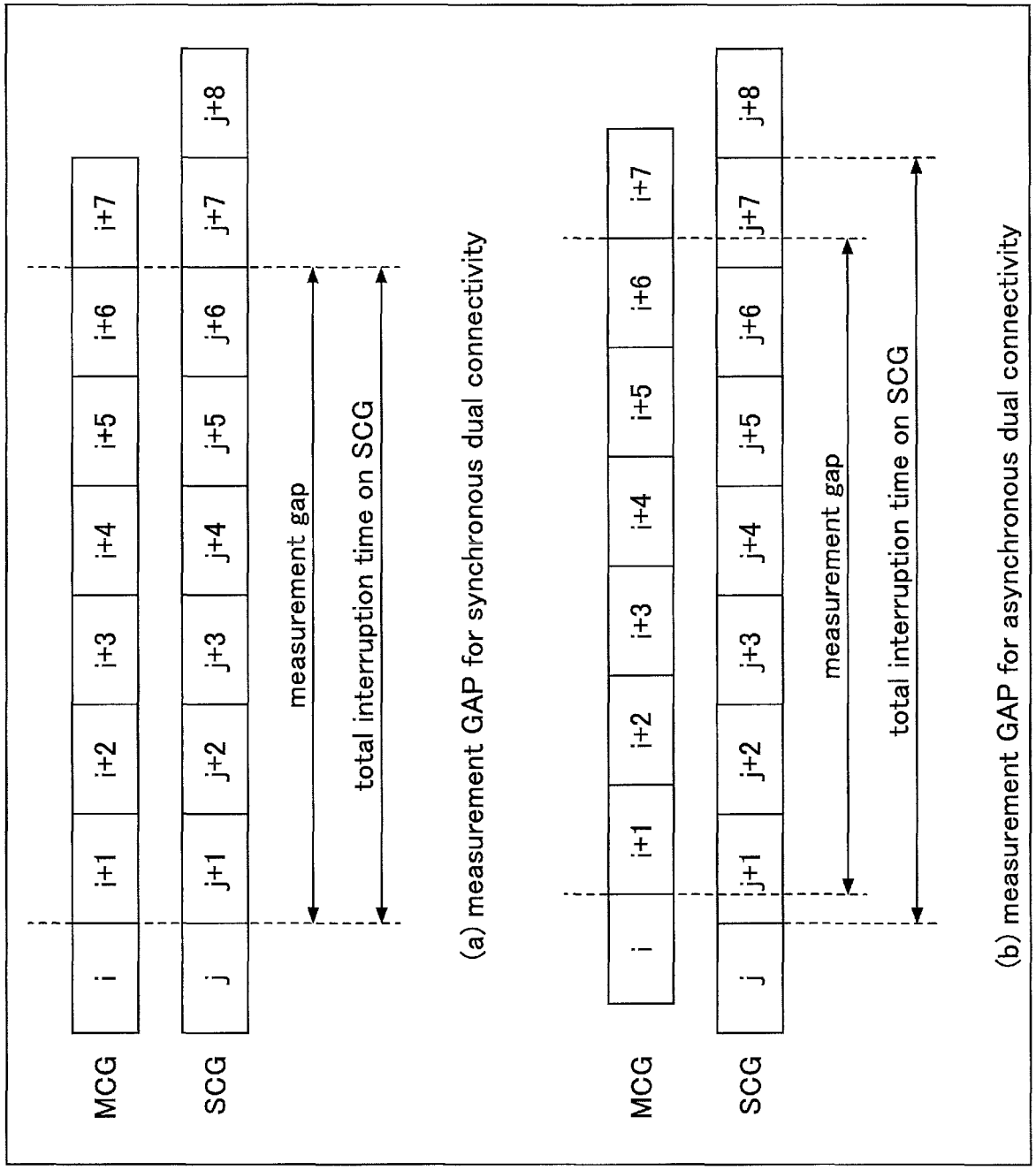
FIG. 13 is a drawing illustrating an example of "total interruption time".

It should be noted that, in section 8 in NPL 2, it is specified that the entire SCG side subframe that partially overlaps with an MCG side gap is defined as "total interruption time" in asynchronous DC as illustrated in FIG. 13 (b). The CC, to which a TTI that partially overlaps with a gap belongs in the modified example 1, may be considered as SCG as specified above, and, by applying the specification to the CC, the period (period between A and F in FIG. 12), in which communications are not performed in the modified example 1, may be considered as the "total interruption time".

It should noted that, although an example of the modified example 1 illustrated in FIG. 12 is based on the operation example 2 in which a gap of the CC with a shorter TTI is used as a reference, a similar discussion may be applied to a case that is based on the operation example 1. In other words, the similar operation can also be performed in the case where a shorter TTI partially overlaps with the gap.

Modified Example 2 of the Operation Examples 1 and 2

In a modified example 2, when the UE detects that there is a TTI that partially overlaps with a gap between CCs with different TTIs, the UE performs communications at the timings, of the TTI, which does not overlap with the gap.

A specific example of the modified example 2 based on the operation example 2 will be described while making reference to FIG. 14 and FIG. 15. In an example of FIG. 14, communications are performed by considering a part, which does not overlap with the gap (each of the parts indicated by A and B in FIG. 14), as a TTI. In this case, the UE and the eNB (MeNB or SeNB) perform transmission and reception of control signals/data in such a way that normal communications can be performed by using the part that is smaller than a normal TTI.

Figure 15:
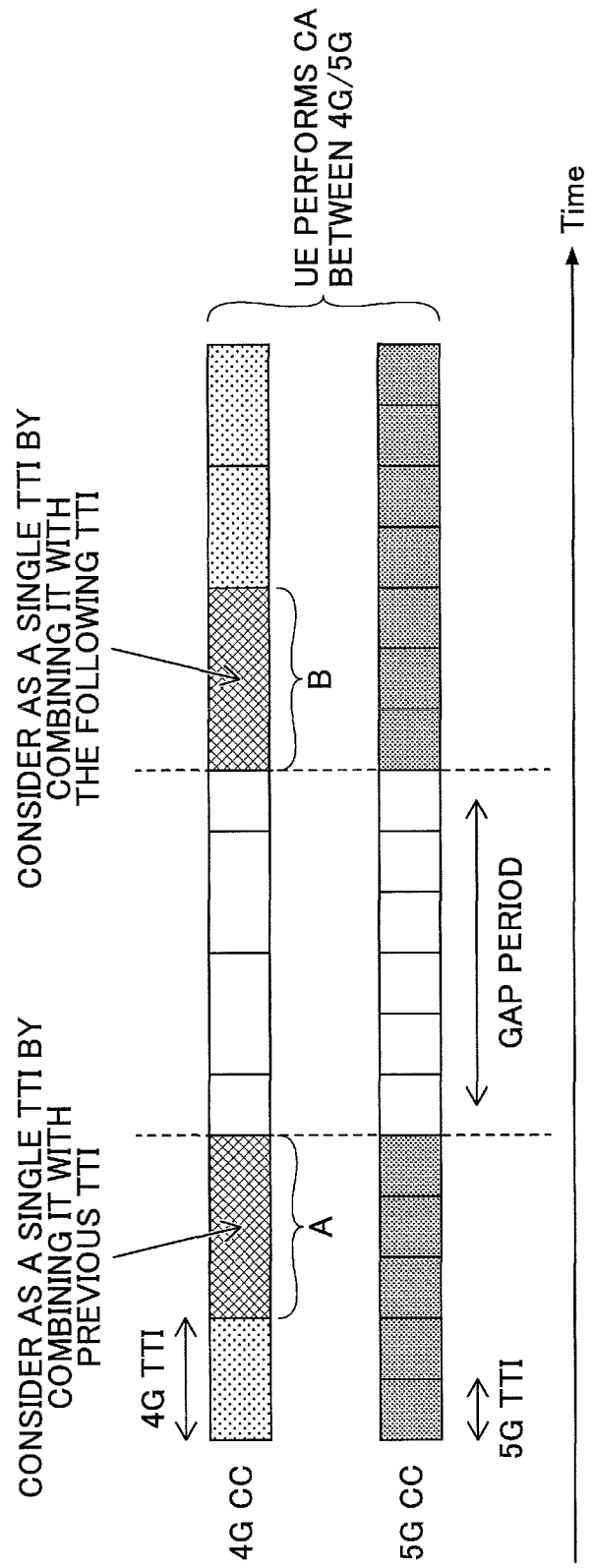
FIG. 15 is a drawing illustrating another modified example 2 of the operation examples 1 and 2.

In an example of FIG. 15, communications are performed by considering as a single TTI a period (each of parts indicated by A and B in FIG. 15) including a part, which does not overlap with the gap, and a TTI (that is not included in the gap) adjacent to the part. In this case, the UE and the eNB (MeNB or SeNB) perform transmission and reception of control signals/data in such a way that normal communications can be performed by using a period longer than a normal TTI as a single TTI.

Figure 14:
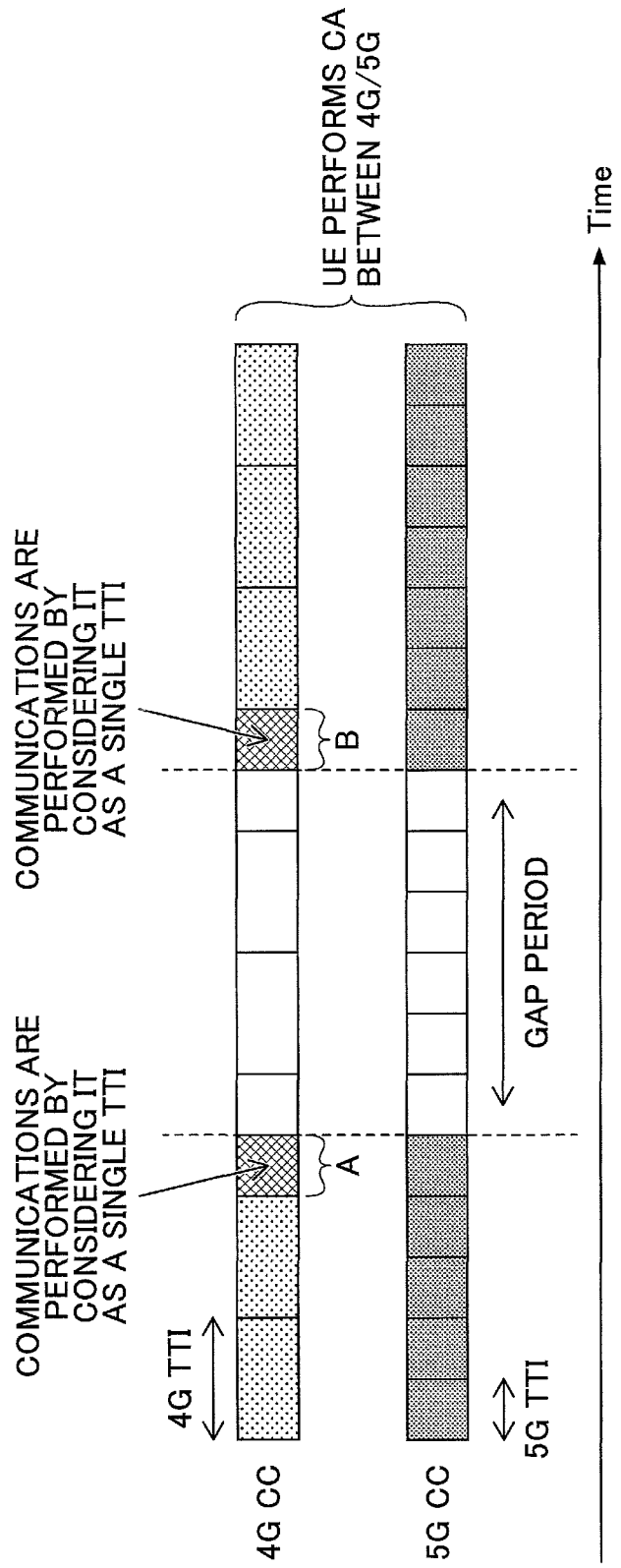
FIG. 14 is a drawing illustrating a modified example 2 of the operation examples 1 and 2.

It should be noted that, although examples of the modified example 2 illustrated in FIG. 14 and FIG. 15 are based on the operation example 2 in which a gap of the CC with a shorter TTI is used as a reference, a similar discussion may be applied to a case that is based on the operation example 1. In other words, the similar operation can also be performed in the case where a shorter TTI partially overlaps with the gap.

In the modified examples, in the case where there exists a CC in which a start/end point of the gap does not match a TTI start/end point, the UE may report the same to the eNB (MeNB or SeNB). As described above, "match" means a case in which time difference between the start/end point of the gap and the TTI point is equal to or less than a predetermined threshold value.

Regarding Selection of the Modified Example 1 and the Modified Example 2

The UE may determine autonomously which of the modified example 1 and the modified example 2 is to be performed by the UE, or may determine the operation based on an indication from the eNB (MeNB or SeNB).

For example, in the case where the UE receives a specific indication from the eNB (MeNB or SeNB), the UE determines which of the modified example 1 and the modified example 2 is to be performed by the UE, and, in the case where the specific indication is not received, the UE determines the operation autonomously.

The eNB (MeNB or SeNB) may transmit the indication by using an RRC message, or by using MAC CE, PDCCH, or other signals.

Further, the indication may be an explicit indication or an implicit indication. As an explicit indication, there is, for example, an indication indicating an operation to be performed (the modified example 1 or the modified example 2).

Further, as an implicit indication, for example, the UE may perform operations of the modified example 2 in the case where the UE receives an indication that communications are available by using a TTI whose length is different from a normal TTI (the above-prescribed partial TTI, a part+adjacent TTI, etc.), and may perform operations of the modified example 1 in the case where the indication is not received.

In the case where the UE determines operations autonomously, a determination method is not limited to a specific method. As an example, the UE may perform operations of the modified example 2 in the case where it is possible for the UE to communicate by using a TTI whose length is different from a normal TTI (the above-prescribed partial TTI, a part+adjacent TTI, etc.), and may perform operations of the modified example 1 in the case where it is not possible for the UE to communicate by using a TTI whose length is different from a normal TTI. In the case where the UE determines the operation autonomously, the UE transmits a determination result to the eNB (MeNB or SeNB). Further, an indication indicating that communications are available by using a TTI whose length is different from a normal TTI may be transmitted separately for the gap start point side TTI and for the gap end point side TTI, or may be transmitted at the same time.

It should be noted that the processes for deviations between the gap and the TTI between CCs described in the modified examples (modified example 1 and modified example 2) may be applied, not only to the operation examples 1 and 2, but also to operation examples 3 to 5.

Operation Example 3

Next, an operation example 3 will be described. In the operation example 3, the UE sets a gap independently for each of the different TTIs.

For example, in the case where the UE and the eNB (MeNB, SeNB) perform CA by using a 4G-CC and a 5G-CC, the UE sets a period specified for each of the 4G-CC and the 5G-CC as a gap.

More specifically, in the case where the UE receives gap configuration (setting) information items for corresponding 4G-CC and 5G-CC from the eNB (MeNB, SeNB) (in the case where the eNB transmits gap configuration (setting) information items for corresponding 4G-CC and 5G-CC), the UE sets a gap of the 4G-CC by using a gap configuration (setting) information item for the 4G-CC, and sets a gap of the 5G-CC by using a gap configuration (setting) information item for the 5G-CC.

More specifically, in the case where the UE receives a gap configuration (setting) information item for one of the 4G-CC and the 5G-CC from the eNB (MeNB, SeNB) (in the case where the eNB transmits a gap configuration (setting) information item for one of the 4G-CC and the 5G-CC), the UE sets a gap of the corresponding CC by using the gap configuration (setting) information item, and sets a gap of the other CC by using the gap configuration (setting) information item. For example, when the UE receives a gap configuration (setting) information item for only the 4G-CC indicating to set a gap with a length of 4G-TTI*6, the UE sets a gap with a length of 5G-TTI*6 for the 5G-CC.

The above example is based on a rule indicating that a gap for the other of the CCs should be set by using the same number of TTIs as the number of TTIs of the gap in the gap configuration (setting) information item for one of the CCs. However, this is only an example.

As described above, in the case where the UE sets a gap for the other CC, the UE sets the gap according to a predetermined rule. Further, as a rule to be used for setting a gap for the other CC, in addition to the rule related to the length of the gap as described above, a rule may be provided which indicates, for example, that the gaps should be set in such a way that one of the gaps overlaps with the other of the gaps as much as possible. Further, the rule may indicate that the gaps should be set (independently) so that one of the gaps does not overlap with the other of the gaps. Further, the rule may indicate that the other gap should be set by using a timing calculated from one of the gap start timings based on a predetermined method.

Here, in the case where the gaps are set to overlap with each other, heads of the gaps may be set to be aligned with each other, tails of the gaps may be set to be aligned with each other, or one of the gaps may be set to be included in the other of the gaps.

Further, in the case where the UE receives only one of the gap configuration (setting) information items for CCs with different TTIs, the UE may set the other gap according to the one of the gap configuration (setting) information items, and afterwards, in the case where the UE receives the other gap configuration (setting) information item, the UE may set the gaps for CCs according to corresponding gap configuration (setting) information items. It should be noted that the gap may be set independently in the same TTI.

Figure 16:
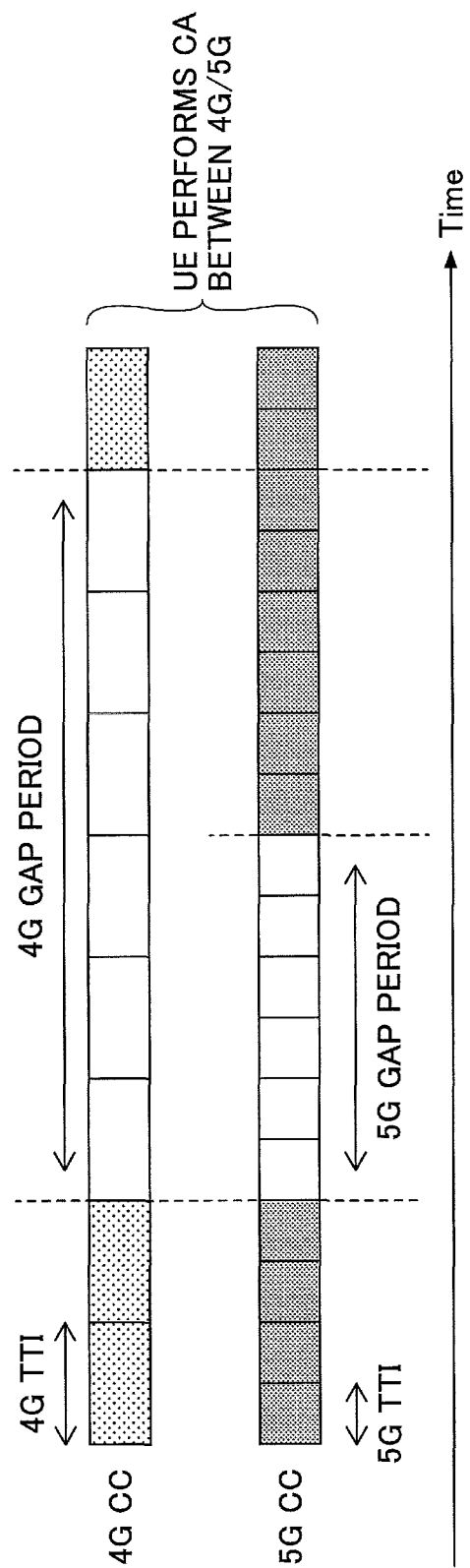
FIG. 16 is a drawing illustrating an example of a case in which an indication is transmitted from a NW (network) indicating that gap start timings are to be aligned with each other in an operation example 3.
Figure 17:
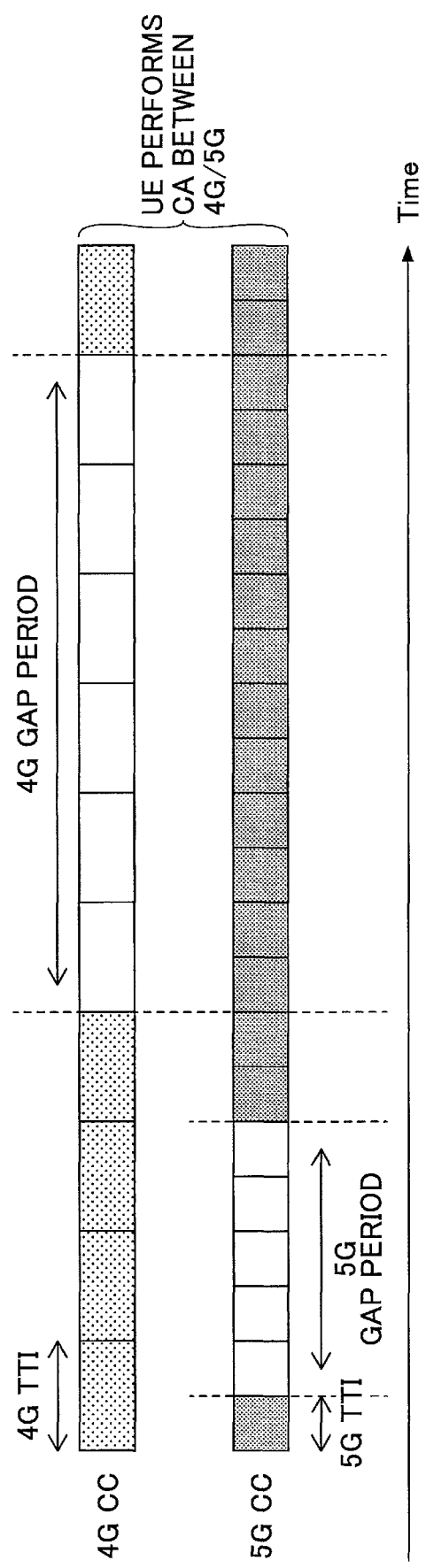
FIG. 17 is a drawing illustrating an example of a case in which an indication is transmitted from a NW (network) indicating that gaps are to not be overlapped with each other at any time in the operation example 3.

Specific examples are illustrated in FIG. 16 and FIG. 17. In an example illustrated in FIG. 16, the UE receives a gap configuration (setting) information item for one of the CCs (e.g., 4G-CC) and sets a gap for the one CC (e.g., 4G-CC). Here, a gap of 6 TTIs is set. Further, the UE sets a gap for the other CC (5G-CC) in such a way that the start timing of the other gap is aligned with the start timing of the one gap. Here, the gap is set as 6 TTIs (6 TTIs in 5G) based on the above-described gap configuration (setting) information item.

Regarding setting the gaps to be aligned with each other, such a rule may be preset in the UE, or such an indication may be transmitted from the eNB (MeNB or SeNB).

In an example illustrated in FIG. 17, the UE receives a gap configuration (setting) information item for one of the CCs (e.g., 4G-CC) and sets a gap for the one CC (e.g., 4G-CC). Here, a gap of 6 TTIs is set. Further, the UE sets a gap (5 TTIs in this example) for the other CC (5G-CC) in such a way that the gap for the other CC does not overlap at any time with the gap for the one CC. Regarding setting the gaps to not be overlapped with each other at any time, such a rule may be preset in the UE, or such an indication may be transmitted from the eNB (MeNB or SeNB).

According to the operation example 3, more efficient communications will be available by setting different gaps between CCs with different TTIs because it is assumed that the measurement purpose and priority are different for each RAT. Further, in the case of 5G, the RAT is new. Therefore, there is a possibility that the UE has functions for 4G measurement and 5G measurement and the functions may be efficiently used.

Operation Example 4

Next, an operation example 4 will be described. In the operation example 4, in the case where the UE performs the operation example 1, that is, in the case where the UE sets a gap common to CCs with different TTIs according to a gap for the CC with a longer TTI, when measuring a measuring target related to the shorter TTI, upon completion of the measurement, the UE ends the gap in a period shorter than the set gap period. Here, it should be noted that the "ends" includes "is considered to end". In the period after the gap is ended, necessary communications may be performed.

Figure 18:
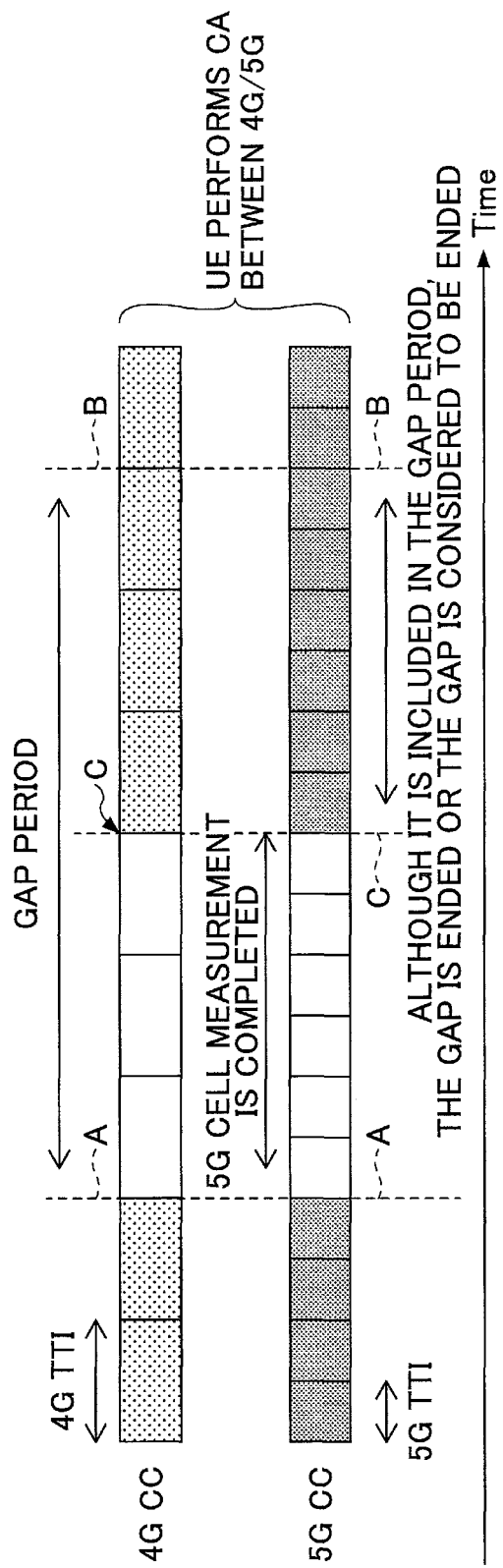
FIG. 18 is a drawing illustrating an operation example 4.

A specific example is illustrated in FIG. 18. In the case where the UE and the eNB (MeNB, SeNB) perform CA by using a 4G-CC and a 5G-CC, first, the UE sets a gap for the 5G-CC in accordance with a period specified for the 4G-CC (e.g., 4G-TTI*6). The gap is a period between A and B in FIG. 18.

In this example, for example, it is assumed that the UE has received from the eNB (MeNB or SeNB) an indication indicating measurement of a 5G frequency (e.g., cell of 5G-TTI). The UE measures the 5G frequency in the gap, and, upon completion of the measurement, ends the gap in a period shorter than the set gap period. In other words, in this example, the UE ends the gap at the time indicated by C in FIG. 18, and afterwards, it is possible for the UE to communicate with the eNB. It should be noted that the "completion of the measurement" means that, for example, a synchronization signal of a measurement target cell is captured and an identifier of the cell is determined. Further, the "completion of the measurement" may mean that a reference signal of a measurement target cell is received and an RSRP/RSRQ measurement result is obtained.

In the case where the 5G-TTI is shorter than the 4G-TTI and it is possible to perform 5G measurement by using the similar number of 5G-TTIs (e.g., 6 TTIs) as 4G, it is considered that time for measuring a 5G cell is shorter than the time for measuring a 4G cell, and thus, the measurement is completed in the middle of the gap as illustrated in FIG. 18. When the measurement is completed, the gap is not needed any more. Therefore, more efficient gap setting is realized by ending the gap at the time when the measurement is completed.

In an example of FIG. 18, when the gaps for 4G and 5G are ended at the time after "C", similar to the UE, the eNB (MeNB or SeNB) can perform communications by using the 4G-CC and the 5G-CC after "C".

However, it is assumed that it is not possible for the 4G-corresponding function (existing function) of the eNB (MeNB or SeNB) to determine that the 4G gap has been ended autonomously by the UE. In this case, the UE cannot perform 4G communications during a period between C and B in FIG. 18. On the other hand, it is considered that it is possible for the 5G-corresponding function as a new function of the eNB (MeNB or SeNB) to determine that the 4G gap has been ended autonomously by the UE. Therefore, 5G communications will be available without any waste.

Operation Example 5

Next, an operation example 5 will be described. In the operation example 5, similar to the operation example 4, it is assumed that the UE performs the operation example 1. In the operation example 5, in the case where the UE sets a gap common to CCs with different TTIs according to a gap for the CC with a longer TTI, when measuring a measuring target related to the shorter TTI, the UE measures multiple measurement targets in a single gap period.

Figure 19:
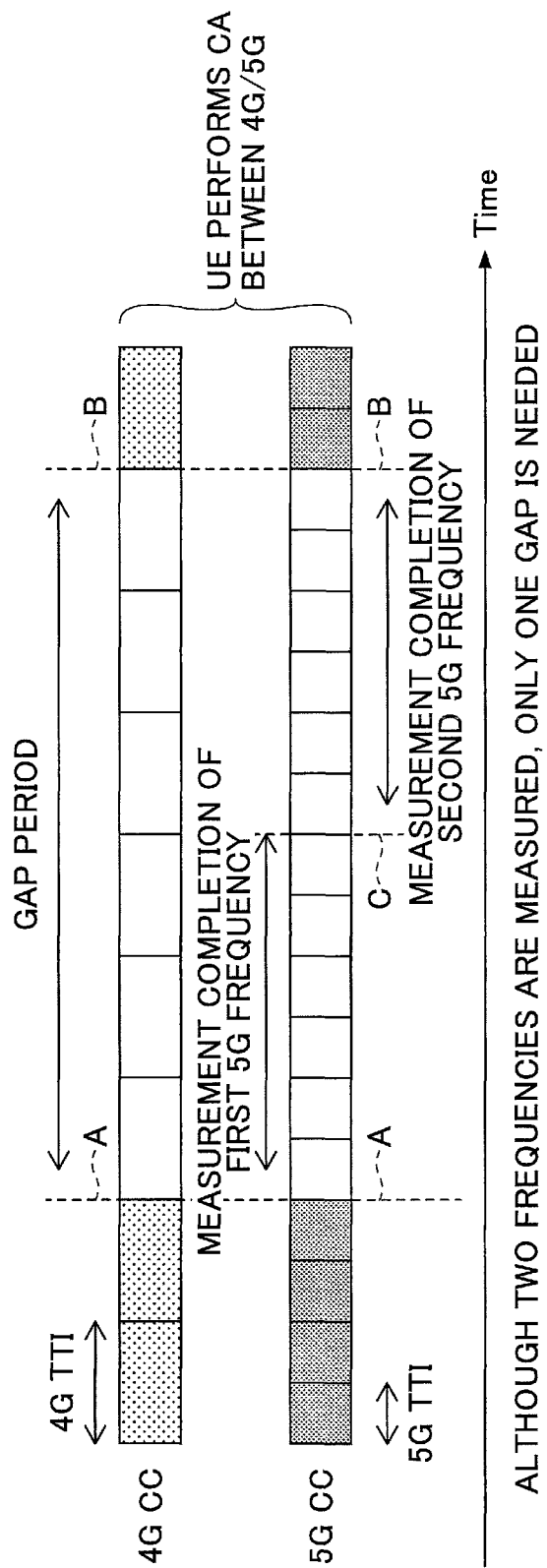
FIG. 19 is a drawing illustrating an operation example 5.

A specific example is illustrated in FIG. 19. In the case where the UE and the eNB (MeNB, SeNB) perform CA by using a 4G-CC and a 5G-CC, first, the UE sets a gap for the 5G-CC in accordance with a period specified for the 4G-CC (e.g., 4G-TTI*6). The gap period is a period between A and B in FIG. 19.

In this example, for example, it is assumed that the UE has received from the eNB (MeNB or SeNB) an indication indicating measurement of two 5G frequencies (e.g., two cells of the 5G-TTI). The UE measures the first 5G frequency in the first period (period between A and C in FIG. 19) in the gap, and measures the second 5G frequency in the next period (period between C and B in FIG. 19).

In the operation example 5, it is possible to measure multiple measurement targets by using a smaller number of gaps, and thus, it is possible to realize efficient communications and a gap configuration.

Regarding Capability Report on Operation Examples 1 to 5

Regarding the operation examples 1 to 5 (including modified examples) as described above, the UE may transmit to the eNB (MeNB or SeNB) capability information indicating existence or non-existence of capability to perform the operations.

Regarding the transmission timing of capability information by the UE, it may be a timing before the gap configuration such as communication start timing, or may be a timing when an operation related to the gap configuration is started. The timing when an operation related to the gap configuration is started refers to a case, for example, in which a 4G eventA2 measurement start indication is received, or a case in which the UE transmits the eventA2 measurement.

Contents of capability information that the UE transmits to the eNB (MeNB or SeNB) are, for example, information indicating executability of the operation example-n (n is any one of, or a plurality of, 1 to 5), and/or, information indicating executability of the options.

Further, the capability information may be transmitted per UE, per RAT, per CC in the RAT, per frequency in the RAT, per band in the RAT, or per intra-RAT/inter-RAT band combination.

Further, in the case where the UE receives from the eNB (MeNB or SeNB) a configuration (setting) indication related to an operation to which the UE does not correspond (does not have capability), the UE may report to the eNB (MeNB or SeNB) that the UE does not correspond to the operation.

(Apparatus Structure)
<UE Structure>

Figure 20:
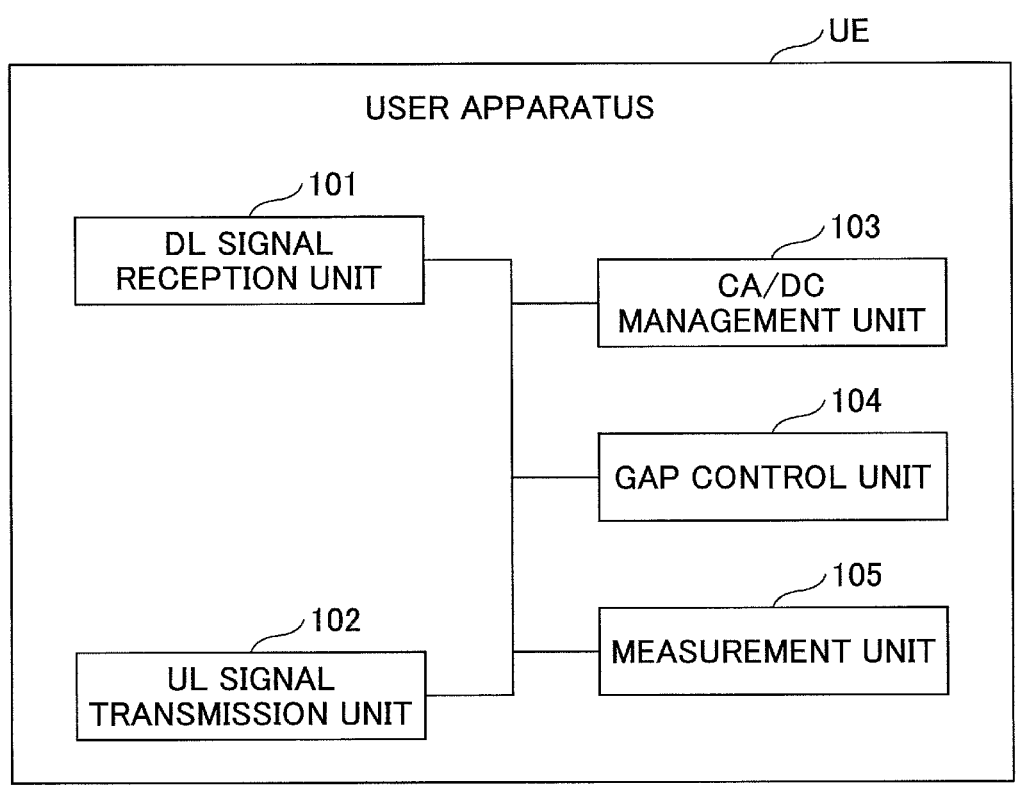
FIG. 20 is a structure diagram of a user apparatus UE according to an embodiment.

FIG. 20 illustrates a structure example of a UE that performs the operations described above. It should be noted that FIG. 20 illustrates function units in the UE especially related to an embodiment only.

As illustrated in FIG. 20, a UE according to an embodiment includes a DL signal reception unit 101, a UL signal transmission unit 102, a CA/DC management unit 103, a gap control unit 104, and a measurement unit 105.

The DL signal reception unit 101 receives a radio signal from an eNB (MeNB, SeNB) and extracts information from the radio signal. The UL signal transmission unit 102 generates a radio signal from transmission information and transmits the radio signal to the eNB (MeNB, SeNB). The CA/DC management unit 103 performs management (storing set identification information and its status, etc.), addition, removal, activation, deactivation, etc., of each cell (CC) included in CA/DC.

The gap control unit 104 performs operations described in the operation examples 1 to 5 (including modified examples) and performs gap configuration (setting) (gap application). Further, the gap control unit 104 includes functions for detecting deviations of boundaries between the gap and a TTI and for handling the deviations as described in the modified examples. The DL signal reception unit 101/the UL signal transmission unit 102 does not perform communications during the gap period set by the gap control unit 104. More specifically, the gap control unit 104 transmits to the DL signal reception unit 101/the UL signal transmission unit 102 an indication indicating that communications with the eNB (MeNB, SeNB) should be stopped at the start point of the gap, and transmits to the DL signal reception unit 101/the UL signal transmission unit 102 an indication indicating that communications with the eNB (MeNB, SeNB) should be resumed at the end point of the gap. However, it should be noted that the above operation is an example.

Further, for example, the measurement unit 104 measures a measurement target (e.g., reception power and/or reception quality of a specified frequency or a cell) during the gap period according to an indication from the eNB (MeNB, SeNB). Further, the gap control unit 104 may have a function for transmitting capability information.

The structure of the user apparatus UE illustrated in FIG. 20 may be entirely realized by a hardware circuit (e.g., one or more IC chips), or may be partially realized by a hardware circuit and the remaining part may be realized by a CPU and programs.

Figure 21:
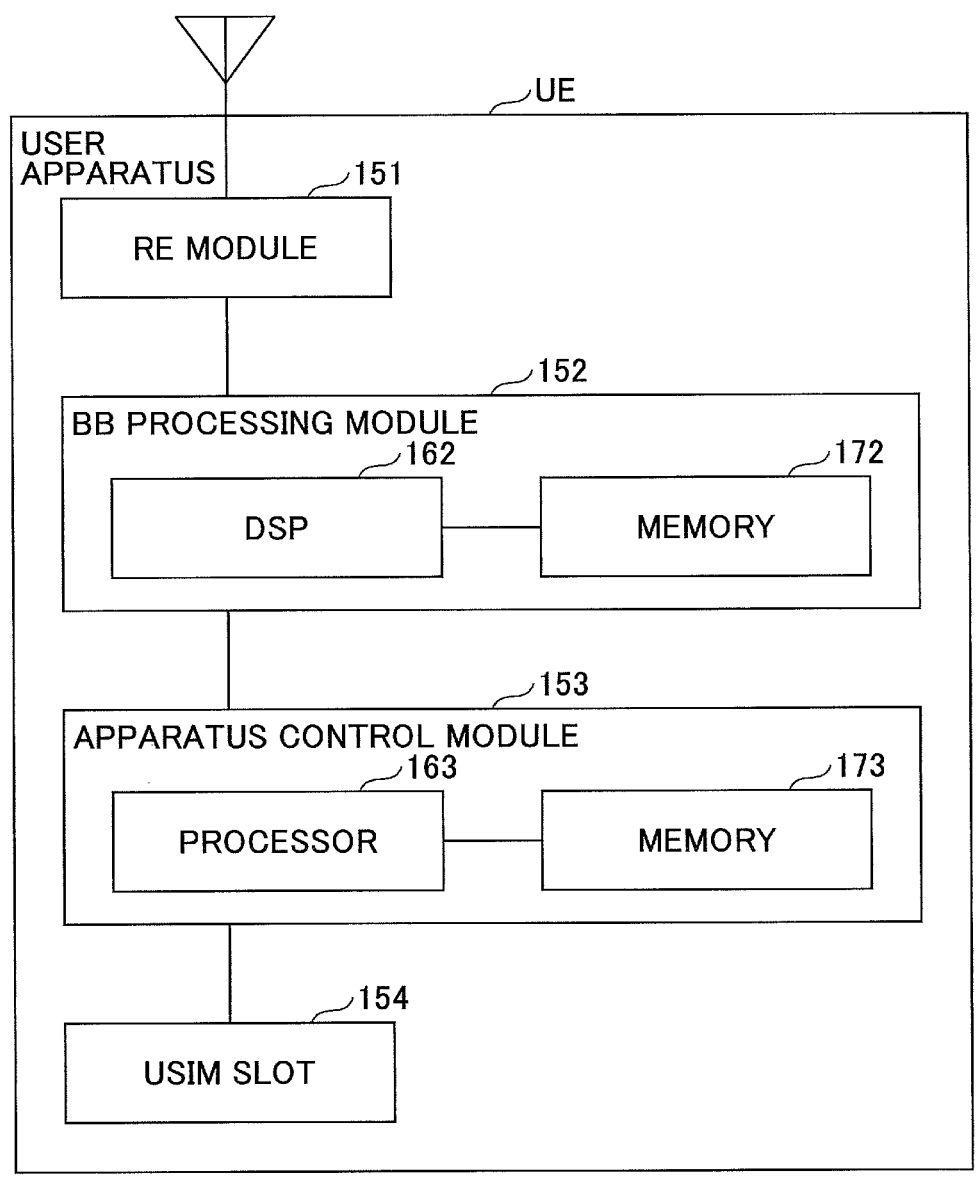
FIG. 21 is a HW (hardware) configuration diagram of the user apparatus UE.

FIG. 21 is a drawing illustrating an example of a hardware (HW) configuration of the user apparatus UE. FIG. 21 illustrates a structure closer to an implementation example compared to FIG. 20. As illustrated in FIG. 21, the user apparatus UE includes an RE (radio equipment) module 151 for performing a process related to a radio signal, a BB (base band) processing module 152 for performing a baseband signal process, an apparatus control module 153 for performing a process of an upper layer, etc., and a USIM slot 154 which is an interface for accessing a USIM card.

The RE module 151 generates a radio signal to be transmitted from an antenna by performing D/A (digital-to-analog) conversion, modulation, frequency conversion, power amplification, etc., for a digital baseband signal received from the BB processing module 152. Further, the RE module 151 generates a digital baseband signal by performing frequency conversion, A/D (analog to digital) conversion, demodulation, etc., for a received radio signal, and transmits the generated signal to the BB processing module 152. The RE module 151 has, for example, a function of a physical layer, etc., in the DL signal reception unit 101 and the UL signal transmission unit 102 illustrated in FIG. 20.

The BB processing module 152 performs a process of converting bidirectionally between an IP packet and a digital baseband signal. A DSP (digital signal processor) 162 is a processor for performing signal processing in the BB processing module 152. A memory 172 is used as a work area of the DSP 162. The BB processing module 152 has, for example, a function of layer 2, etc., in the DL signal reception unit 101 and the UL signal transmission unit 102 illustrated in FIG. 20, and includes the CA/DC control unit 103, the gap control unit 104 and the measurement unit 105. It should be noted that all or a part of functions of the CA/DC control unit 103, the gap control unit 104 and the measurement unit 105 may be included in the apparatus control module 153.

The apparatus control module 153 performs an IP layer protocol process, processes of various types of applications, etc. A processor 163 performs a process for the apparatus control module 153. A memory 173 is used as a work area of the processor 163. Further, the processor 163 reads/writes data from/to the USIM via the USIM slot 154.

It should be noted that the structures (functional divisions) of the apparatus illustrated in FIG. 20 and FIG. 21 are only examples. The implementation method (specific names, arrangement, etc., of the function units) is not limited to a specific implementation method as long as the processes described in an embodiment can be realized. For example, a UE (user apparatus) according to an embodiment may be an apparatus including the following units.

That is, a user apparatus according to an embodiment communicates with a base station in a mobile communication system in which at least two carriers with different TTIs are used. The user apparatus may include a gap control unit configured to set a gap that is a period in which the user apparatus does not perform communications with the base station. The gap control unit sets a gap common to a gap set for one of the two carriers as a gap for the other of the two carriers.

With the above arrangement, it is possible to appropriately set a gap in a mobile communication system in which there exist different TTIs.

The gap control unit may set a gap common to a gap set for one of the two carriers with a longer TTI as a gap for the other carrier of the two carriers with a shorter TTI. With the above arrangement, for example, it is possible to provide CA in which a 4G-CC and a 5G-CC are used without degrading the mobility quality, etc., in the existing NW (NW including 4G only).

The user apparatus may include a measurement unit configured to measure a predetermined carrier during the gap period. The measurement unit may perform the measurement during the gap set by the gap control unit, and, before the gap period elapses, the gap control unit may end the gap at the time when the measurement is completed. With the above arrangement, it is possible to set a gap efficiently.

Further, the user apparatus may include a measurement unit configured to measure a predetermined carrier during the gap period, and the measurement unit may perform measurement of multiple measurement targets during the gap set by the gap control unit. With the above arrangement, it is possible to measure many measurement targets with a smaller number of gaps, and thus, efficient communications are available.

The gap control unit may set a gap common to a gap set for one of the two carriers with a shorter TTI as a gap for the other of the two carriers with a longer TTI. With the above arrangement, as an example, a gap optimized for 5G can be realized and faster communications are available.

In the case where a gap is set for the carrier with a longer TTI and the gap is longer than a gap for the carrier with a shorter TTI, the gap control unit may not consider a period, of the gap period for the carrier with a longer TTI, which does not overlap with the gap for the carrier with a shorter TTI, as a gap for the carrier with a longer TTI. With the above arrangement, it is possible to communicate efficiently.

Further, a user apparatus according to an embodiment performs communications with a base station in a mobile communication system in which at least two carriers with different TTIs are used. The user apparatus may include a gap control unit configured to set a gap that is a period in which the user apparatus does not perform communications with the base station. In the case where an indication of a gap configuration (setting) for one of the two carriers is received from the base station, the gap control unit may set a gap for the other of the two carriers based on the indication of the gap configuration.

With the above arrangement, it is possible to appropriately set a gap in a mobile communication system in which there exist different TTIs.

In the case where at least one of the start point and the end point of the gap for the one of the two carriers does not match a TTI boundary in the other carrier, the gap control unit may consider the entire TTI, of the TTIs of the other carrier, which includes the at least one of the start point and the end point of the gap, as a period in which communications with the base station are not performed. With the above arrangement, it is possible to appropriately set a gap even in the case where there is a deviation between a gap start/end point and a TTI start/end point.

Further, in the case where at least one of the start point and the end point of the gap for the one of the two carriers does not match a TTI boundary in the other carrier, in the TTI, of the TTIs in the other carrier, which includes at least one of the start point and the end point of the gap for the one of the two carriers, the gap control unit may consider a part, which is not overlapped with the gap, as a single TTI in which communications are available, or, may consider the part, which is not overlapped with the gap, and a TTI adjacent to the part as a single TTI in which communications are available. With the above arrangement, it is possible to appropriately set a gap even in the case where there is a deviation between a gap start/end point (gap boundary) and a TTI start/end point (TTI boundary).

<eNB Structure>

Figure 22:
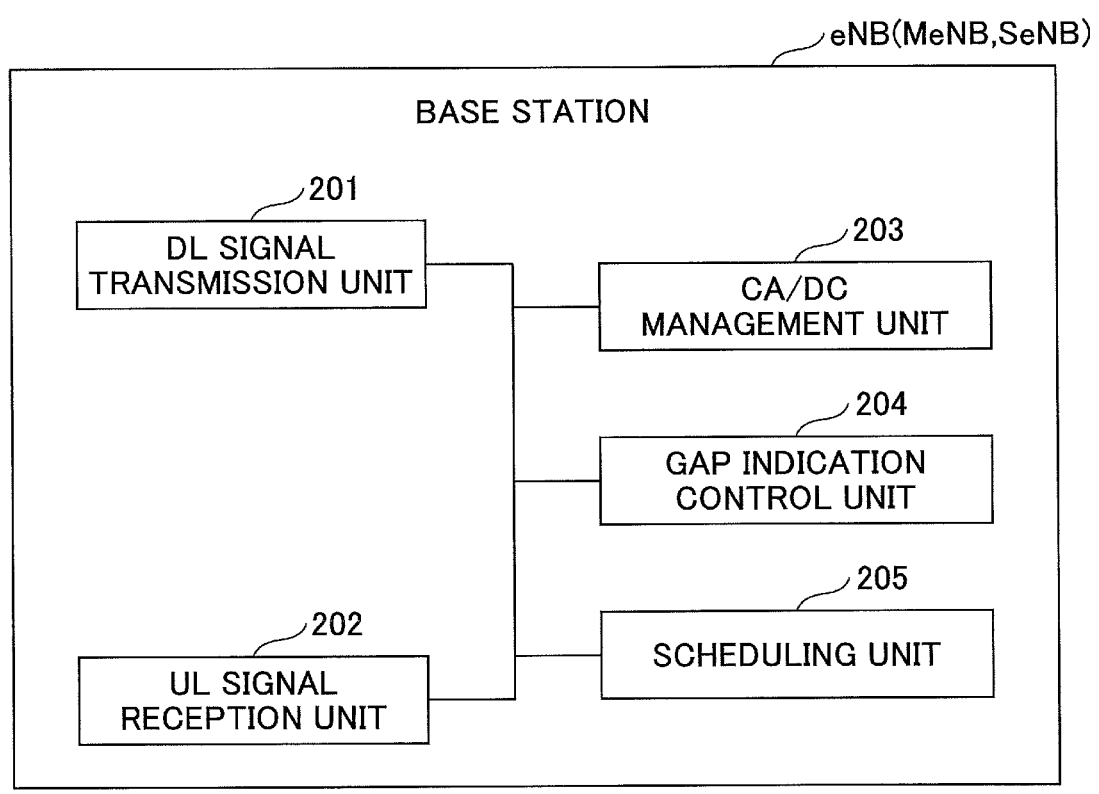
FIG. 22 is a structure diagram of a base station eNB according to an embodiment.

FIG. 22 illustrates a structure example of an eNB that performs the operations described above. The eNB may be an eNB that performs intra-base-station CA, or may be an MeNB or SeNB that performs DC. Further, FIG. 22 illustrates function units in the eNB especially related to an embodiment only.

As illustrated in FIG. 22, an eNB according to an embodiment includes a DL signal transmission unit 201, a UL signal reception unit 202, a CA/DC management unit 203, a gap indication control unit 204, and a scheduling unit 205.

The DL signal transmission unit 201 generates a radio signal from transmission information and transmits the radio signal to a UE. The UL signal reception unit 202 receives a radio signal from the UE and extracts information from the radio signal. The CA/DC management unit 203 performs management (stores set identification information and its status, etc.), addition, removal, activation, deactivation, etc., of each cell (CC) included in CA/DC.

The gap indication control unit 204 performs operations of gap configuration the same as the gap configuration of the UE described in the operation examples 1 to 5 (including modified examples), and controls the scheduling unit 205 to stop scheduling during the gap period. Further, in the operation examples 1 to 5 (including modified examples), the gap indication control unit 204 also includes a function for transmitting gap configuration information, an operation indication, etc., in the case where the eNB transmits the configuration information, the operation indication, etc., to the UE. Further, the gap indication control unit 204 may include a function for transmitting a measurement indication to the UE.

The scheduling unit 205 does not perform UL/DL scheduling during a period of a gap (including a period considered as a gap in the case where such a period exists) reported by the gap indication control unit 204.

The structure of the base station eNB illustrated in FIG. 22 may be entirely realized by hardware circuit (e.g., one or more IC chips), or may be partially realized by a hardware circuit and the remaining part may be realized by a CPU and programs.

Figure 23:
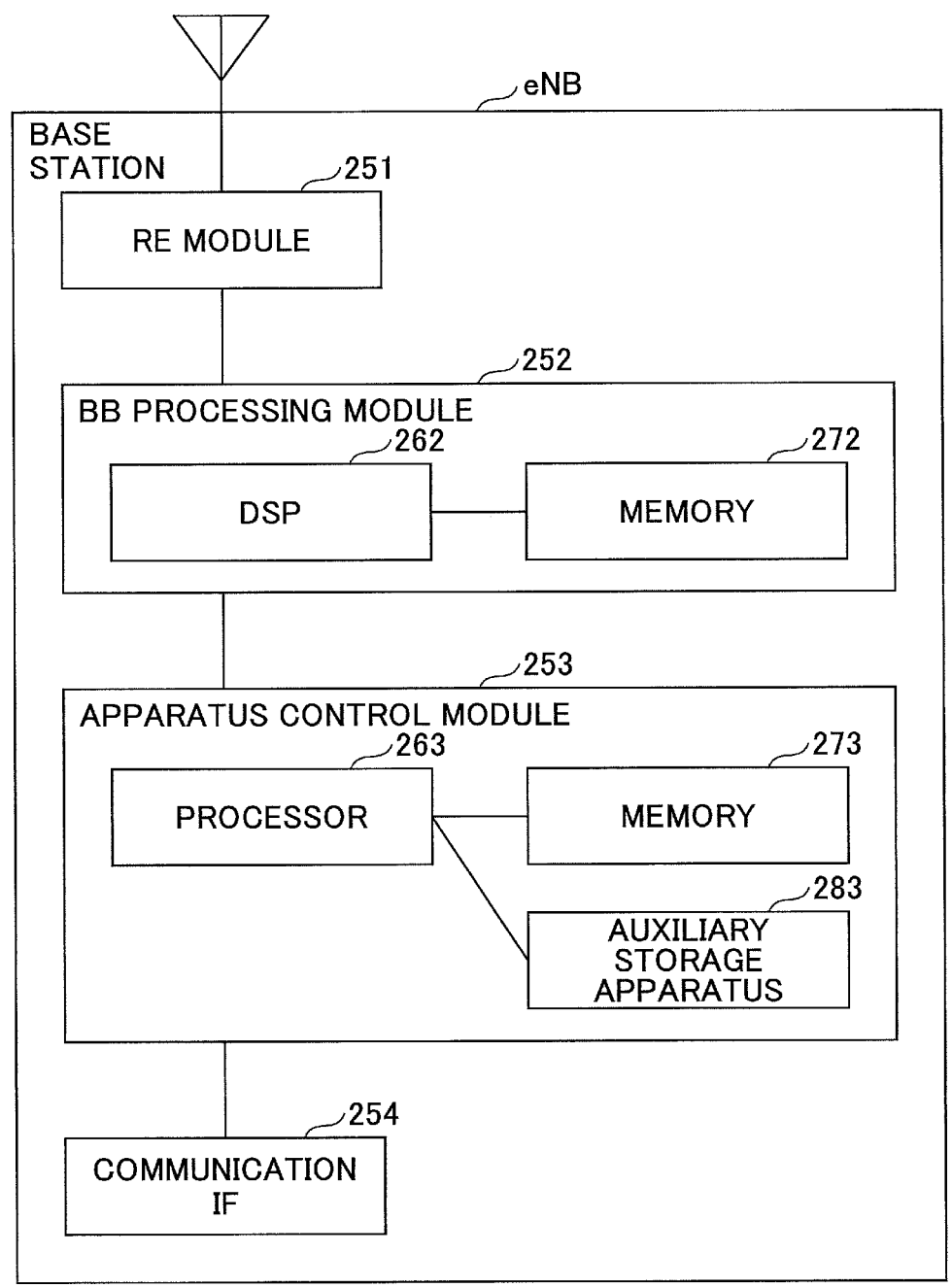
FIG. 23 is a HW configuration diagram of the base station eNB.

FIG. 23 is a drawing illustrating an example of a hardware (HW) configuration of the base station eNB. FIG. 23 illustrates a structure closer to an implementation example compared to FIG. 22. As illustrated in FIG. 23, the base station eNB includes an RE module 251 for performing a process related to a wireless signal, a BB processing module 252 for performing baseband signal processing, an apparatus control module 253 for performing a process of an upper layer, etc., and a communication IF 254 as an interface for connecting to a network.

The RE module 251 generates a radio signal to be transmitted from an antenna by performing D/A conversion, modulation, frequency conversion, power amplification, etc., for a digital baseband signal received from the BB processing module 252. Further, the RE module 251 generates a digital baseband signal by performing frequency conversion, A/D conversion, demodulation, etc., for a received radio signal, and transmits the generated signal to the BB processing module 252. The RE module 251 has, for example, a function of a physical layer, etc., in the DL signal transmission unit 201 and the UL signal reception unit 202 illustrated in FIG. 22.

The BB processing module 252 performs a process of converting bidirectionally between an IP packet and a digital baseband signal. DSP 262 is a processor for performing signal processing in the BB processing module 252. A memory 272 is used as a work area of the DSP 252. The BB processing module 252 has, for example, a function of layer 2, etc., in the DL signal transmission unit 201 and the UL signal reception unit 202 illustrated in FIG. 22, and includes the the CA/DC management unit 203, the gap indication control unit 204 and the scheduling unit 205. It should be noted that all or a part of functions of the CA/DC management unit 203, the gap indication control unit 204, and the scheduling unit 205 may be included in the apparatus control module 253.

The apparatus control module 253 performs an IP layer protocol process, an OAM process, etc. A processor 263 performs a process for the apparatus control module 253. A memory 273 is used as a work area of the processor 263. An auxiliary storage apparatus 283 is, for example, an HDD, etc., and stores various types of setting information items, etc., used for operations of the base station eNB.

It should be noted that the structures (functional divisions) of the apparatus illustrated in FIG. 22 and FIG. 23 are only examples. The implementation method (specific names, arrangement, etc., of the function units) is not limited to a specific implementation method as long as the processes described in an embodiment can be realized. For example, an eNB (base station) according to an embodiment may also be an apparatus including the following units.

In other words, for example, a base station according to an embodiment performs communications with a user apparatus in a mobile communication system in which at least two carriers with different TTIs are used. The base station includes a gap indication unit configured to transmit an indication related to a gap that is a period in which the user apparatus does not perform communications with the base station. The gap indication unit transmits an indication of a first gap operation or a second gap operation to the user apparatus. In the case where an indication of the first gap operation is received, the user apparatus sets a gap common to a gap set for one of the two carriers with a longer TTI as a gap for the other of the two carriers with a shorter TTI. In the case where an indication of the second gap operation is received, the user apparatus sets a gap common to a gap set for one of the two carriers with a shorter TTI as a gap for the other of the two carriers with a longer TTI.

With the above arrangement, it is possible to appropriately set a gap in a mobile communication system in which there exist different TTIs.

Further, the "unit" included in each of the above apparatuses may be substituted for by "means", "circuit", "device", etc.

Functions of a UE according to an embodiment, in which UE a CPU and a memory are included, may be realized by having a program executed by the CPU (processor), may be realized by hardware such as hardware circuitry or the like in which the processing logic described in an embodiment is included, or may be realized by a mixture of a program and hardware.

Functions of an eNB according to an embodiment, in which eNB a CPU and a memory are included, may be realized by having a program executed by the CPU (processor), may be realized by hardware such as hardware circuitry or the like in which the processing logic described in an embodiment is included, or may be realized by a mixture of a program and hardware.

As described above, embodiments of the present invention have been described. The disclosed invention is not limited to these embodiments, and a person skilled in the art would understand various variations, modifications, replacements, or the like. Specific examples of numerical values have been used for encouraging understanding of the present invention. These numeric values are merely examples and, unless otherwise noted, any appropriate values may be used. In the above description, partitioning of items is not essential to the present invention. Matters described in more than two items may be combined if necessary. Matters described in one item may be applied to matters described in another item (as long as they do not conflict). In a functional block diagram, boundaries of functional units or processing units do not necessarily correspond to physical boundaries of parts. Operations of multiple functional units may be physically performed in a single part, or operations of a single functional unit may be physically performed by multiple parts. For the sake of description convenience, the UE and the eNB have been described using functional block diagrams, and such apparatuses may be implemented by hardware, by software, or by combination of both. The software executed according to an embodiment may be stored in a random access memory (RAM), a flash memory, a read-only memory (ROM), an EPROM, an EEPROM, a register, a hard disk drive (HDD), a removable disk, a CD-ROM, a database, a server, or any other appropriate recording medium. The present invention is not limited to the above embodiments and various variations, modifications, alternatives, replacements, etc., may be included in the present invention without departing from the spirit of the invention.

The present application is based on and claims the benefit of priority of Japanese Priority Application No. 2015-164258 filed on Aug. 21, 2015, the entire contents of which are hereby incorporated by reference.

DESCRIPTION OF THE REFERENCE NUMERALS

UE User apparatus
eNB, MeNB, SeNB base station
101 DL signal reception unit
102 UL signal transmission unit
103 CA/DC management unit
104 Gap control unit
105 Measurement unit
151 RE module 152 BB processing module
153 Apparatus control module
154 USIM slot
201 DL signal transmission unit
202 UL signal reception unit
203 CA/DC management unit
204 Measurement control unit
205 Scheduling unit
251 RE module
252 BB processing module
253 Apparatus control module
254 Communication IF

What is claimed is:

1. A user apparatus comprising:
a processor coupled to a transmitter that sets a gap period during which the user apparatus does not perform communications with a base station, wherein:
the processor and the transmitter perform communications with the base station in a mobile communication system in which at least two carriers of different frequencies or Radio Access Technologies (RATs) are used,
the processor and the transmitter set a common gap, the common gap is set by setting a first gap set for a first carrier as a second gap for a second carrier, and
the processor and the transmitter set the common gap by setting a gap set for one of the two carriers with a longer Transmission Time Interval (TTI) as a gap for the other of the two carriers with a shorter TTI.

2. The user apparatus according to claim 1, wherein:
the processor and the receiver perform a measurement of a predetermined carrier during the gap period, and
the processor and the receiver perform the measurement in the gap period set by the processor and the transmitter, and, before the gap period elapses, the processor ends the gap period at a time when the measurement is completed.

3. The user apparatus according to claim 1, wherein the processor and the receiver further:
perform measurement of a predetermined carrier out of the at least two carriers during the gap period and
perform measurement of a plurality of measurement targets in the gap period.

4. The user apparatus according to claim 1, wherein the processor sets the common gap by setting a gap set for one of the two carriers with a shorter TTI as a gap for the other of the two carriers with a longer TTI.

5. A user apparatus comprising:
a processor coupled to a receiver that sets a gap period during which the user apparatus does not perform communications with a base station, wherein:
the processor and the receiver perform communications with the base station in a mobile communication system in which at least two carriers of different frequencies or Radio Access Technologies (RATs) are used,
in a case where the receiver receives a gap configuration indication for one of the two carriers, the processor sets a gap for the other of the two carriers based on the gap configuration indication, and
the processor and the transmitter set the common gap by setting a gap set for one of the two carriers with a longer Transmission Time Interval (TTI) as a gap for the other of the two carriers with a shorter TTI.

6. The user apparatus according to claim 1, wherein
in the case where at least one of a start point and an end point of the gap for the one of the two carriers does not match a TTI boundary in the other carrier, the processor determines an entire TTI, of TTIs of the other carrier, which includes at least one of the start point and the end point of the gap, as a period in which communications with the base station are not performed.

7. A gap configuration method performed by a user apparatus, the gap configuration method comprising:
setting a gap period during which the user apparatus does not perform communications with a base station, wherein:
in the setting, the user apparatus sets a common gap, the common gap being set as common by setting a first gap set for a first carrier as a second gap for a second carrier,
the user apparatus performs communications with the base station in a mobile communication system in which at least two carriers of different frequencies or Radio Access Technologies (RATs) are used, and
the processor and the transmitter set the common gap by setting a gap set for one of the two carriers with a longer Transmission Time Interval (TTI) as a gap for the other of the two carriers with a shorter TTI.

8. A gap configuration method performed by a user apparatus, the gap configuration method comprising:
setting a gap period during which the user apparatus does not perform communications with the base station, wherein:
in the setting, in the case where the user apparatus receives from the base station a gap configuration indication for one of the two carriers, the user apparatus sets a gap for the other of the two carriers based on the gap configuration indication,
the user apparatus performs communications with the base station in a mobile communication system in which at least two carriers of different frequencies or Radio Access Technologies (RATs) are used, and
wherein the processor and the transmitter set the common gap by setting a gap set for one of the two carriers with a longer Transmission Time Interval (TTI) as a gap for the other of the two carriers with a shorter TTI.

9. A base station comprising:
a transmitter that transmits an indication related to a gap period during which the user apparatus does not perform communications with the base station, wherein:
a processor and the transmitter transmit an indication of a first gap operation or a second gap operation to the user apparatus,
in a case where the user apparatus receives an indication of the first gap operation, the user apparatus sets a common gap by setting a gap set for one of the two carriers with a longer TTI as a gap for the other of the two carriers with a shorter TTI,
in a case where the user apparatus receives an indication of the second gap operation, the user apparatus sets a common gap by setting a first gap set for a first carrier with a shorter TTI as a second gap for a second carrier with a longer TTI, and
the user apparatus performs communications with the base station in a mobile communication system in which at least two carriers of different frequencies or Radio Access Technologies (RATs) are used.

10. The user apparatus according to claim 2, wherein
in the case where at least one of a start point and an end point of the gap for the one of the two carriers does not match a TTI boundary in the other carrier, the processor determines an entire TTI, of TTIs of the other carrier, which includes at least one of the start point and the end point of the gap, as a period in which communications with the base station are not performed.

11. The user apparatus according to claim 3, wherein
in the case where at least one of a start point and an end point of the gap for the one of the two carriers does not match a TTI boundary in the other carrier, the processor determines an entire TTI, of TTIs of the other carrier, which includes at least one of the start point and the end point of the gap, as a period in which communications with the base station are not performed.

12. The user apparatus according to claim 4, wherein
in the case where at least one of a start point and an end point of the gap for the one of the two carriers does not match a TTI boundary in the other carrier, the processor determines an entire TTI, of TTIs of the other carrier, which includes at least one of the start point and the end point of the gap, as a period in which communications with the base station are not performed.

13. The user apparatus according to claim 5, wherein
in the case where at least one of a start point and an end point of the gap for the one of the two carriers does not match a TTI boundary in the other carrier, the processor determines an entire TTI, of TTIs of the other carrier, which includes at least one of the start point and the end point of the gap, as a period in which communications with the base station are not performed.

* * * * *